US012709418B2

(12) United States Patent
Luong et al.

(10) Patent No.: US 12,709,418 B2
(45) Date of Patent: Aug. 18, 2026

(54) MULTICOPTER

(71) Applicants: Quoc Luong, Castro Valley, CA (US); Quang Phi, Ho Chi Minh City (VN); REAL-TIME ROBOTICS INC, Castro Valley, CA (US)

(72) Inventors: Quoc Luong, Castro Valley, CA (US); Quang Phi, Ho Chi Minh City (VN)

(73) Assignee: REAL-TIME ROBOTICS INC, Castro Valley, CA (US)

( * ) Notice: Subject to any disclaimer, the term of this patent is extended or adjusted under 35 U.S.C. 154(b) by 0 days.

(21) Appl. No.: 18/701,577

(22) PCT Filed: Oct. 17, 2022

(86) PCT No.: PCT/IB2022/059959
§ 371 (c)(1),
(2) Date: Apr. 15, 2024

(87) PCT Pub. No.: WO2023/062611
PCT Pub. Date: Apr. 20, 2023

(65) Prior Publication Data

US 2024/0400238 A1 Dec. 5, 2024

(30) Foreign Application Priority Data

Oct. 15, 2021 (AU) ................................ 2021904300
Jul. 31, 2022 (AU) ................................ 2022902148

(51) Int. Cl.
*B64U 20/50* (2023.01)
*B64U 10/14* (2023.01)
*B64U 50/19* (2023.01)

(52) U.S. Cl.
CPC ............. *B64U 20/50* (2023.01); *B64U 10/14* (2023.01); *B64U 50/19* (2023.01); *B64U 2201/20* (2023.01)

(58) Field of Classification Search
CPC ........ B64U 20/50; B64U 10/14; B64U 50/19; B64U 2201/20; B64U 30/293;
(Continued)

(56) References Cited

U.S. PATENT DOCUMENTS 2,834,573 A * 5/1958 Stalker .................... F04D 29/32 415/181
3,081,964 A * 3/1963 Quenzler ............ B64C 29/0033 244/54

(Continued)

FOREIGN PATENT DOCUMENTS

CN 106379514 A 2/2017
CN 206125436 U 4/2017

(Continued)

OTHER PUBLICATIONS

Australian Patent Office acting as International Searching Authority, "International Search Report and Written Opinion," for International Application No. PCT/IB2022/059959, Nov. 29, 2022.

*Primary Examiner* — Medhat Badawi
(74) *Attorney, Agent, or Firm* — Dentons Durham Jones Pinegar; Sarah W. Matthews

(57) ABSTRACT

Disclosed is a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other in the vertical axis, the cross arm pivoting connection adapted to allow each of the cross arms to rotate towards the main arm
(Continued)

to a stowed state wherein each of the arms are substantially parallel to each other, and wherein the multicopter comprises i) landing gear that extends from the intersection region between the main arm and cross arms of each flight arm via a hingable connection; or ii) landing gear that extends pivotably from the hub that is adapted to fold against the main arm, the landing gear having a "V"-shape when in a deployed configuration, or iii) a notional polyhedron defined by the flight arms when in the stowed state, the notional polyhedron having sufficient volume to contain, when present, the one or more payloads, one or more communications devices, and to at least partially contain a battery; or iv) a stowed volume that is less than 10% of the volume of the multicopter when in the operational; or v) two or more payloads extending from any one or more of the battery, the hub, or the cross arms in the region of the cross arm connection to the main arm, or the main arm; a combination of any two or more of (i) to (v).

24 Claims, 17 Drawing Sheets

(58) Field of Classification Search
CPC ................ B64U 60/40; B64U 2101/26; B64U 2201/104; B64U 20/80; B64U 50/30; B64D 1/10; Y02T 50/60
See application file for complete search history.

(56) References Cited

U.S. PATENT DOCUMENTS 4,093,155 A * 6/1978 Kincaid, Jr. ............ B64C 27/12 416/171
5,709,357 A * 1/1998 von Wilmowsky .... B64C 27/52 244/17.23
5,727,754 A * 3/1998 Carter, Jr. ............... B64C 27/02 244/17.11
6,233,003 B1 * 5/2001 Ono ..................... H04N 13/221 348/E13.008
6,352,411 B1 * 3/2002 Bucher ................... F04D 29/34 403/302
6,435,453 B1 * 8/2002 Carter, Jr. ............... B64C 27/02 244/17.11
6,487,779 B1 * 12/2002 Underthun .............. B26B 7/005 30/296.1
6,655,631 B2 * 12/2003 Austen-Brown .... B64D 27/355 244/12.4
6,802,694 B2 * 10/2004 Bucher ................... F04D 29/34 416/207
7,448,571 B1 * 11/2008 Carter, Jr. ............. B64C 27/021 244/6
7,959,104 B2 * 6/2011 Kuntz .................... A63H 27/12 244/50
8,052,081 B2 * 11/2011 Olm ....................... B64U 10/13 244/17.23
8,646,720 B2 * 2/2014 Shaw .................. B64C 29/0025 244/17.23
8,931,730 B2 * 1/2015 Wang ...................... B64C 25/12 244/17.23
9,030,149 B1 * 5/2015 Chen ...................... F16M 11/04 318/648
9,187,174 B2 * 11/2015 Shaw ...................... B64C 27/28
9,272,784 B2 * 3/2016 Nelson .................... B64C 27/26
9,296,477 B1 * 3/2016 Coburn .................. B64D 35/04
9,457,901 B2 * 10/2016 Bertrand .............. B64U 30/293
9,469,394 B2 * 10/2016 Vaughn .................. B64U 10/13
9,567,076 B2 * 2/2017 Zhang .................... B64U 20/87
9,616,998 B2 * 4/2017 Oakley ................ G05D 1/0202
9,643,720 B2 * 5/2017 Hesselbarth ........... C12M 23/46
9,738,380 B2 * 8/2017 Claridge .................. G08G 5/80
9,764,829 B1 * 9/2017 Beckman ............ B64C 29/0033
9,821,909 B2 * 11/2017 Moshe .................... B64C 27/22
9,834,305 B2 * 12/2017 Taylor .................... B64U 30/10
9,896,195 B2 * 2/2018 Ou ......................... B64U 10/13
9,914,537 B2 * 3/2018 Wu ...................... B64U 30/291
D816,546 S * 5/2018 Wang .......................... D12/16.1
9,972,212 B1 * 5/2018 Sperindeo ................. G06T 7/90
10,011,354 B2 * 7/2018 Goldstein ............ B64U 30/293
10,065,726 B1 * 9/2018 Phan ...................... B64D 17/80
10,104,289 B2 * 10/2018 Enriquez ................ G03B 31/00
10,118,697 B2 * 11/2018 Weissenberg ........ B64U 30/293
10,137,983 B2 * 11/2018 Horn ...................... B64U 10/20
10,183,741 B2 * 1/2019 Roeseler ................ B64U 70/20
D851,540 S * 6/2019 Tompkin ..................... D12/16.1
D852,091 S * 6/2019 Tompkin ...................... D21/436
10,315,761 B2 * 6/2019 McCullough ........... B64C 39/02
10,351,235 B2 * 7/2019 Karem ...................... B64C 9/18
10,386,188 B2 * 8/2019 Tian ........................ G01S 17/86
10,435,176 B2 * 10/2019 McClure ................ G05D 1/102
10,455,155 B1 * 10/2019 Kalinowski .......... H04N 23/683
10,513,329 B2 * 12/2019 Ou ......................... B64U 30/20
10,611,048 B1 * 4/2020 Helsing ................ B27K 3/0235
10,612,523 B1 * 4/2020 Srinivasan .............. F03D 13/25
10,625,855 B2 * 4/2020 Deng .................... B64C 39/024
10,647,404 B2 * 5/2020 Sugaki .................... B64C 27/56
10,669,023 B2 * 6/2020 Heinen .................. B64U 10/16
10,676,188 B2 * 6/2020 Campbell ............... B64C 27/26
10,696,414 B2 * 6/2020 Woodman ............ B64U 30/293
10,703,459 B2 * 7/2020 Yang ....................... B64C 11/28
10,717,524 B1 * 7/2020 Boyes .................. G06Q 10/083
10,730,619 B2 * 8/2020 Ni ........................ B64U 30/293
10,752,357 B2 * 8/2020 von Flotow ........... B64U 70/20
10,793,270 B2 * 10/2020 Chen ...................... B64U 20/50
10,831,186 B2 * 11/2020 Van Niekerk ........ G05D 1/0044
D906,170 S * 12/2020 Thompson .................. D12/16.1
10,946,959 B2 * 3/2021 Nwosu ................... B64U 10/14
10,981,661 B2 * 4/2021 Oldroyd .................. B64C 39/08
11,091,258 B2 * 8/2021 Groninga ............ B64C 29/0025
11,465,739 B2 * 10/2022 Hymer .................... B64C 27/22
11,530,028 B1 * 12/2022 Wiegman ............... B64D 31/06
11,628,932 B2 * 4/2023 Seung .................... B64U 60/50 244/17.23
11,636,447 B1 * 4/2023 Mishra ................... G07C 5/006 705/305
11,718,399 B2 * 8/2023 Lee ........................ B64U 30/20 244/23 C
11,738,613 B1 * 8/2023 Spikes .................... B60B 19/02 244/2
D999,675 S * 9/2023 Paterson ...................... D12/174
11,829,161 B2 * 11/2023 Vander Mey ........... B64C 27/10
11,884,422 B2 * 1/2024 Lowe ..................... B64U 50/19
11,898,690 B1 * 2/2024 Luong ................ F16M 11/2085
11,975,864 B2 * 5/2024 Hartkop ................. B64U 20/30
12,017,809 B1 * 6/2024 Bao ........................ B64U 10/14
12,084,200 B2 * 9/2024 Peters ..................... B64C 29/02
D1,046,685 S * 10/2024 Paterson ..................... D12/16.1
12,103,673 B2 * 10/2024 Hefner .................... B64C 29/02
12,145,753 B2 * 11/2024 Bitar ...................... B64U 50/14
12,168,533 B1 * 12/2024 Hinman ................. B64U 70/97
12,202,634 B1 * 1/2025 England ................. B64U 20/87
12,253,649 B1 * 3/2025 Clark ..................... G01K 1/026
12,312,081 B2 * 5/2025 Hanna .................... B64U 10/25
2001/0046442 A1 * 11/2001 Bucher ................. F04D 25/088 416/210 R
2002/0104922 A1 * 8/2002 Nakamura ............. B64U 30/20 244/17.25
2006/0251522 A1 * 11/2006 Matheny ................. F01D 5/326 416/219 R
2008/0251308 A1 * 10/2008 Molnar ................... B64C 27/02 180/209
2009/0008499 A1 * 1/2009 Shaw ..................... B64U 80/80 244/17.23
2009/0250549 A1 * 10/2009 Wiggerich ............ B64U 30/24 244/17.11
2009/0283629 A1 * 11/2009 Kroetsch ................ B64U 20/40 244/17.23
2010/0171001 A1 * 7/2010 Karem ................. G05D 1/0858 244/76 R

(56) References Cited

U.S. PATENT DOCUMENTS

2011/0001020 A1* 1/2011 Forgac ................ B64C 29/0033 244/7 A
2011/0268194 A1* 11/2011 Nagano ............ H04N 21/23614 375/E7.076
2012/0138732 A1* 6/2012 Olm ....................... B64U 10/17 244/17.23
2012/0232718 A1* 9/2012 Rischmuller .......... A63H 30/04 701/2
2012/0287274 A1* 11/2012 Bevirt .................... H04N 7/185 348/E7.085
2013/0051778 A1* 2/2013 Dimotakis ........... G03B 15/006 396/12
2013/0099063 A1* 4/2013 Grip ..................... B64D 27/353 156/60
2013/0175390 A1* 7/2013 Woodworth ............. B64D 1/14 244/54
2013/0176423 A1* 7/2013 Rischmuller .......... A63H 27/12 348/114
2013/0280084 A1* 10/2013 Nagle ..................... B64C 11/26 29/889.6
2014/0356174 A1* 12/2014 Wang ................... A63H 27/001 416/204 R
2015/0136897 A1* 5/2015 Seibel .................. B64U 30/293 244/6
2015/0137424 A1* 5/2015 Lyons ..................... B29C 43/54 264/317
2015/0149000 A1* 5/2015 Rischmuller .......... G05D 1/102 701/7
2015/0259066 A1* 9/2015 Johannesson .......... B64U 20/50 244/17.27
2015/0266571 A1* 9/2015 Bevirt ................. B64C 29/0033 244/7 C
2015/0321758 A1* 11/2015 Sarna, II .............. G05D 1/0011 244/63
2015/0370250 A1* 12/2015 Bachrach ............... G01C 23/00 701/2
2016/0129998 A1* 5/2016 Welsh .................... B64U 20/92 244/12.3
2016/0137298 A1* 5/2016 Youngblood .......... A63H 27/12 244/17.23
2016/0176520 A1* 6/2016 Goldstein ............ B64U 30/293 244/17.23
2016/0214713 A1* 7/2016 Cragg .................... B64U 30/20
2016/0214715 A1* 7/2016 Meffert .................. B64U 20/87
2016/0286128 A1* 9/2016 Zhou .................... H04N 23/698
2016/0327950 A1* 11/2016 Bachrach ............. H04N 23/661
2016/0340028 A1* 11/2016 Datta ................... B64U 30/296
2016/0376000 A1* 12/2016 Kohstall ................. B64C 37/00 114/313
2016/0376004 A1* 12/2016 Claridge ................. B64C 19/00 701/3
2017/0036771 A1* 2/2017 Woodman ............... B64C 25/54
2017/0043870 A1* 2/2017 Wu ...................... B64U 30/291
2017/0057630 A1* 3/2017 Schwaiger .............. B64C 3/385
2017/0075351 A1* 3/2017 Liu ...................... H04N 23/685
2017/0113793 A1* 4/2017 Toulmay ................. B64C 27/22
2017/0113800 A1* 4/2017 Freeman .............. B64U 30/299
2017/0138093 A1* 5/2017 Wu ..................... E05B 65/5284
2017/0144741 A1* 5/2017 Wang ...................... B64C 25/32
2017/0158328 A1* 6/2017 Foley ................... B64U 30/296
2017/0217585 A1* 8/2017 Hulsman ................ B64U 50/13
2017/0233069 A1* 8/2017 Apkarian ............... B64U 40/20 244/7 R
2017/0240274 A1* 8/2017 Regev .................... B64U 10/20
2017/0244270 A1* 8/2017 Waters .................... H02J 50/90
2017/0297681 A1* 10/2017 Yamada ................. B64U 10/13
2017/0297738 A1* 10/2017 von Flotow ............. B64D 1/02
2017/0301111 A1* 10/2017 Zhao ...................... H04N 23/90
2017/0313400 A1* 11/2017 Zhydanov .............. B64U 50/19
2017/0327218 A1* 11/2017 Morin ..................... B64C 3/385
2018/0024570 A1* 1/2018 Hutson .................. G05D 1/102 701/4
2018/0032042 A1* 2/2018 Turpin ................. H04N 13/296
2018/0046187 A1* 2/2018 Martirosyan .......... G05D 1/106
2018/0093171 A1* 4/2018 Mallinson ................ A63F 7/07
2018/0093781 A1* 4/2018 Mallinson ................ A63F 7/07
2018/0118322 A1* 5/2018 Harris .................... B64U 50/19
2018/0157276 A1* 6/2018 Fisher .................... G01C 21/18
2018/0170510 A1* 6/2018 Brock .................... B64U 50/19
2018/0181119 A1* 6/2018 Lee ...................... G05D 1/0038
2018/0194463 A1* 7/2018 Hasinski ................ B64U 30/20
2018/0208301 A1* 7/2018 Ye .......................... B64U 30/29
2018/0208311 A1* 7/2018 Zhang .................. H04N 23/698
2018/0257769 A1* 9/2018 Goldstein ............... B64C 27/50
2018/0284575 A1* 10/2018 Sugaki ................... H04N 23/51
2018/0312253 A1* 11/2018 Zhao ...................... G05D 1/106
2018/0312254 A1* 11/2018 Ni ........................ B64U 30/293
2018/0326255 A1* 11/2018 Schranz ................. A63B 21/08
2018/0327093 A1* 11/2018 von Flotow ............. B64D 5/00
2018/0354620 A1* 12/2018 Baek ...................... B64U 30/20
2019/0002124 A1* 1/2019 Garvin ................... B64D 47/08
2019/0023395 A1* 1/2019 Lee .......................... G08G 5/74
2019/0084673 A1* 3/2019 Chen ...................... B64U 20/50
2019/0100313 A1* 4/2019 Campbell .............. B64U 10/14
2019/0102874 A1* 4/2019 Goja ...................... G06N 5/022
2019/0118944 A1* 4/2019 Kimchi .................... G08G 5/76
2019/0135403 A1* 5/2019 Perry ..................... B64U 10/25
2019/0144100 A1* 5/2019 Samir ..................... B64C 13/34 244/39
2019/0168872 A1* 6/2019 Grubb ....................... B64F 5/10
2019/0215457 A1* 7/2019 Enke .................... G05D 1/0094
2019/0248464 A1* 8/2019 Ye .......................... B64U 60/50
2019/0248487 A1* 8/2019 Holtz ..................... G06V 20/17
2019/0289193 A1* 9/2019 Bevirt .................... B64U 80/82
2019/0329903 A1* 10/2019 Thompson ............ B64C 39/024
2019/0377345 A1* 12/2019 Bachrach ............... G06V 20/17
2019/0378423 A1* 12/2019 Bachrach ............... B64U 20/87
2019/0379268 A1* 12/2019 Adams ................. G03B 15/006
2020/0001990 A1* 1/2020 Jiang ....................... B64C 11/02
2020/0023995 A1* 1/2020 Song ...................... B64D 45/00
2020/0064135 A1* 2/2020 Lai ......................... G05D 1/101
2020/0073385 A1* 3/2020 Jobanputra ............ G06N 3/105
2020/0108930 A1* 4/2020 Foley ..................... B64U 80/00
2020/0156749 A1* 5/2020 Scacchi .................. B63H 3/008
2020/0164966 A1* 5/2020 Suzuki ................... B64U 50/19
2020/0391864 A1* 12/2020 Lee ........................ B64U 20/87
2021/0061482 A1* 3/2021 Ulrich ..................... B64C 27/82
2021/0107636 A1* 4/2021 Seung .................. B64U 30/293
2021/0107682 A1* 4/2021 Kozlenko .............. B64U 80/25
2021/0109312 A1* 4/2021 Honjo .................. G03B 15/006
2021/0206487 A1* 7/2021 Iqbal ................... B64C 29/0083
2021/0214068 A1* 7/2021 Bry ........................ B64U 20/83
2021/0261252 A1* 8/2021 Dayan .................... B64U 10/13
2021/0362849 A1* 11/2021 Bower .................... B64C 27/26
2022/0009626 A1* 1/2022 Baharav .................. B64C 27/26
2022/0119102 A1* 4/2022 Shaanan ................. B64C 27/59
2022/0177109 A1* 6/2022 Hefner .................... B64C 29/02
2022/0234747 A1* 7/2022 Bower ................... B64D 31/16
2022/0278538 A1* 9/2022 Kainzmaier ............ B60L 53/36
2022/0315224 A1* 10/2022 Kominami ............. B64U 50/19
2022/0324569 A1* 10/2022 Zhou ...................... B64U 10/16
2023/0280742 A1* 9/2023 Bachrach ............. G05D 1/0094 701/2
2024/0183486 A1* 6/2024 Luong .................. H04N 23/695
2024/0400238 A1* 12/2024 Luong .................. B64U 30/293

FOREIGN PATENT DOCUMENTS

CN 110816836 A 2/2020
CN 212401522 U 1/2021
WO 2018082004 A1 5/2018

* cited by examiner

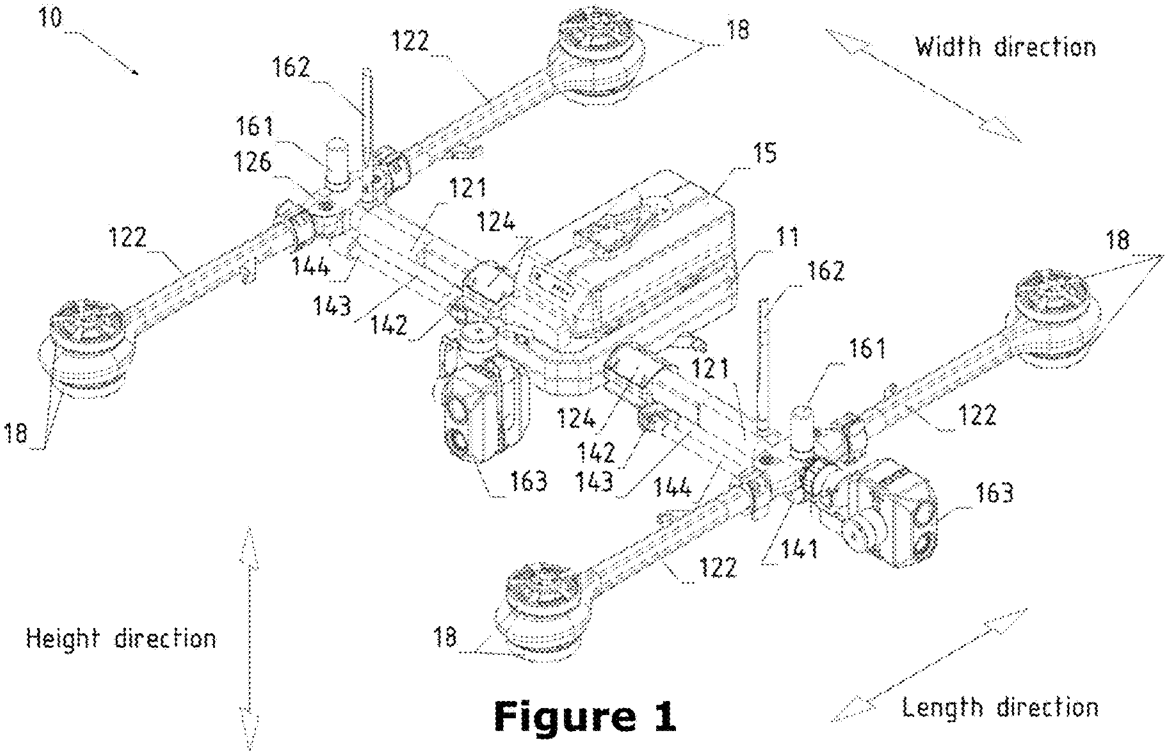
Figure 1
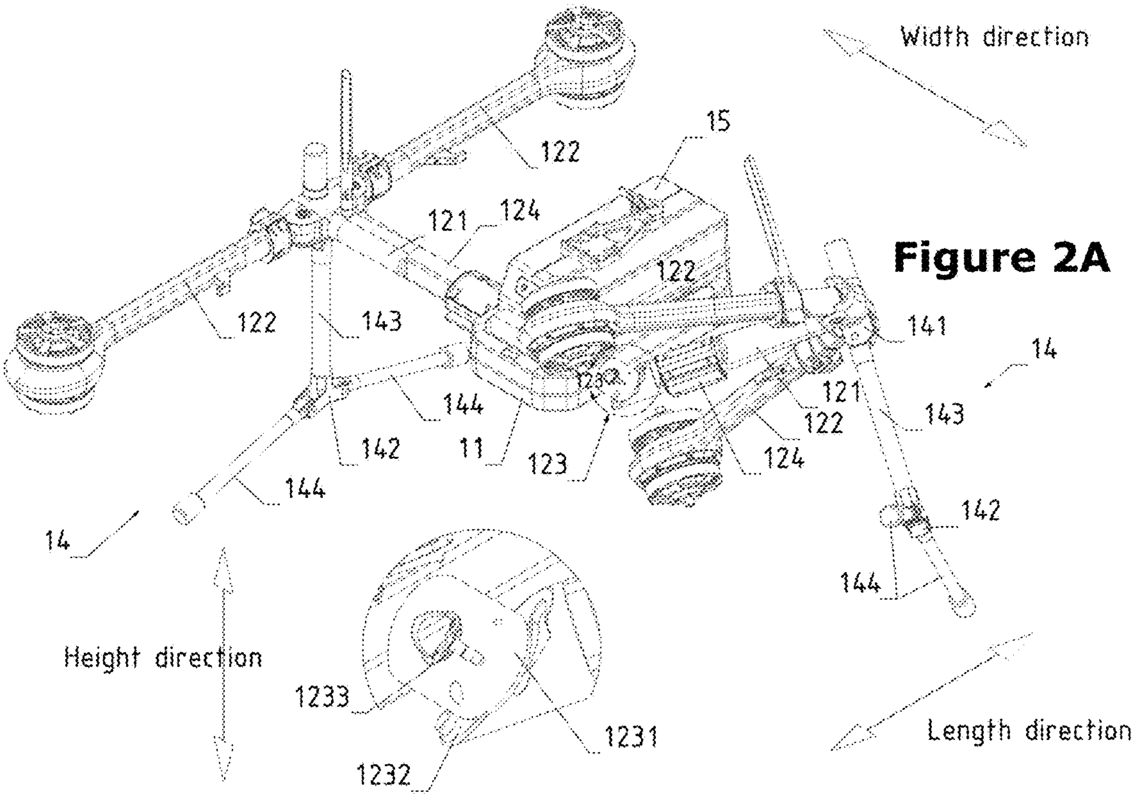
Figure 2A
Figure 2B

MULTICOPTER

CROSS REFERENCE TO RELATED APPLICATIONS

This application is a U.S. a national stage application under 35 U.S.C. 371 of PCT/IB2022/059959 ("the '959 PCT application"), filed Oct. 17, 2022, which claims priority to Australia patent application AU 2021904300 filed Oct. 15, 2021 ("the '300 Priority Application") and AU 2022902148, filed Jul. 31, 2022 ("the '148 Priority Application"). The contents of the '959 PCT Application, the '300 Priority Application and '148 Priority Application are incorporated herein in their entireties.

FIELD OF THE DISCLOSURE

The present disclosure is generally related to multicopter drones and more specifically to multicopter drones with efficient folding and/or sensor placement.

BACKGROUND

Multicopters are used due to their convenience of vertical takeoff and landing, and hovering ability. Multicopters, however, have limited flight time and lift capacity compared to fixed winged aircraft.

Longer flight time and higher lift capacity, in turn, by the law of physics require larger-sized multicopters because larger rotors, which are equivalent to larger wingspans of a fixed wing, generate more lift allowing a multicopter to carry a bigger battery and a heavier payload.

Large multicopters, however, have limited portability. They are more difficult and more costly to carry around. Poor portability in turn reduces the utilization of large multicopters in real world scenarios.

The best folding designs in the industry to date can generally shrink a multicopter's folded volume to around one fifth of its original unfolded volume. A 1:5 shrinking ratio by far still falls short of practical demands. As an example, using the best designs currently available, a quadcopter with 28" rotors would have a folded volume 2.5 times as big as that of a carry-on which is still too big and too inconvenient for everyday travel and use.

For illustration, the dimensions and shrinking ratios of some of the most popular multicopters on the market are presented in Table 1 below.

TABLE 1

Dimensions and shrinking ratios of various multicopters

| Description | DJI M300 | DJI Mavic 2 | DJI Matrice 600 | Sony AirPeak |
|---|---|---|---|---|
| Unfolded Length (w/o props, mm) | 810 | 322 | 1133 | 592 |
| Unfolded Width (w/o props, mm) | 670 | 242 | 984 | 528 |
| Unfolded Height (w/o props, mm) | 430 | 84 | 759 | 513 |
| Folded Length (w/props, mm) | 430 | 214 | 640 | 592 |
| Folded Width (w/props, mm) | 420 | 91 | 582 | 528 |
| Folded Height (w/props, mm) | 430 | 84 | 623 | 513 |
| Own shrinking ratio | 33% | 25% | 28% | 100% |

The equation for determining the Own shrinking ratio is as follows.

$$\text{Own shrinking ratio} = \frac{\text{Unfolded Length} * \text{Unfolded Width} * \text{Unfolded Height}}{\text{Folded Length} * \text{Folded Width} * \text{Folded Height}}$$

Chinese patent application CN 206125436 U of Changsha Tuohang Agricural Science Tech Co Ltd reports a foldable UAV in which the arms fold against fixed landing gear, leading to inefficient folding.

Chinese patent application CN 110816836 A of Shenyang Xuanfei Aviation Tech Co Ltd also reports a foldable UAV in which the arms fold against fixed landing gear, leading to inefficient folding.

US patent application US20210107636 A1 of Doosan Mobility Innovation Inc reports a foldable UAV in which the arms fold against fixed landing gear, leading to inefficient folding.

The industry has been waiting for a new design that can combine the benefits of:

i) the longer flight time and payload capacity of larger-sized multicopters, and ii) the portability of compact drones.

There is an inherent technical challenge to reduce the shrinking ratio to make multicopters more compact in the folded state. The main body which serves mainly as the housing of avionics effectively remains unchanged regardless of the size of the multicopter. In contrast, the arm length of a multicopter has to grow proportionally with the size of the multicopter in order to provide sufficient clearance for bigger rotors. As a result, large multicopters have very long arms relative to the size of the main body. This creates a problem as to how to fold very long arms tightly around a small main body to minimize the folded volume. This is a significant challenge that has not been addressed.

In addition multicopters incorporate other components such as sensors, GPS antennas, RF antennas, a compass, landing gear, and payloads. The presence of the rotors on the multicopter can lead to compromised placement of these components. For example, the rotor may inhibit placement of cameras in certain locations on the of the multicopter or may mean that the camera field of view is not free of the rotor.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

It is desired to address or ameliorate one or more disadvantages or limitations associated with the prior art, or to provide a foldable multicopter, or to at least provide the public with a useful alternative.

SUMMARY OF THE DISCLOSURE

Described is a multicopter design that minimises the folded volume of the multicopter and/or optimizes the placement of payloads and/or sensors.

In a first aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, and the cross arm pivoting connection adapted to allow each of the cross arms to rotate towards the main arm to a stowed state wherein each of the arms are substantially parallel to each other.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and wherein, in the stowed state the flight arms define a notional polyhedron, the notional polyhedron having sufficient volume to contain the one or more payloads and the communications devices, and to at least partially contain a battery.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and wherein the volume of the multicopter when in the stowed state is less than 10% of the volume of the multicopter when in the operational state.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and landing gear that extends from the cross arm pivoting connection, wherein the landing gear is adapted to fold against a flight arm, such that the landing gear is substantially parallel to the flight arm when in the stowed state.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and landing gear that extends from the cross arm pivoting connection, wherein the landing gear is adapted to fold against a main arm, such that the landing gear is substantially parallel to the main arm when in the stowed state.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and landing gear that extends pivotably from the hub, wherein the landing gear is adapted to fold against the main arm, such that the landing gear is substantially parallel to the flight arm when in a stowed state or an operational stowed state, the landing gear having a "V"-shape when in a deployed configuration.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and two or more payloads, each payload extending from any one of the battery, the hub, the cross arms in the region of the cross arm connection to the main arm, or the main arm.

In a further aspect we describe a multicopter foldable between a stowed state and an operational state, the multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and a locking member for attachment to the hub or the battery, the locking member comprising a locking mechanisms to lock cross arms in a stowed configuration, the locking mechanism comprising a first portion being or having a locking slot and a second portion being or having a release leaver, each portion rotatable about an axis, a locking pin on the cross arm for locking into the locking slot, and wherein movement of the locking lever about the rotational point rotates the locking slot about its rotational point thereby releasing the locking pin allowing the cross arm to be moved from the stowed to the unstowed configuration In a further aspect we describe a method of folding and unfolding a multicopter between a stowed state and an operational (unstowed) state comprising providing a multicopter comprising a hub configured to receive one or more payloads and a battery, two or more flight arms that extend substantially horizontally when in the operational state, each flight arm comprising a main arm that each extend from the hub at a main arm pivoting connection, and two cross arms that extend from the main arm at a cross arm pivoting connection, the main arm pivoting connection adapted to allow each of the main arms to pivot towards each other to a stowed state wherein each of the arms are substantially parallel to each other, the cross arm pivoting connection adapted to allow each of the cross arms to rotate towards the main arm to a stowed state wherein each of the arms are substantially parallel to each other, and a locking member for attachment to the hub or the battery, the locking member comprising a locking mechanisms to lock cross arms in a stowed configuration, the locking mechanism comprising a first portion being or having a locking slot and a second portion being or having a release leaver, each portion rotatable about an axis, a locking pin on the cross arm for locking into the locking slot, and wherein movement of the locking lever about the rotational point rotates the locking slot about its rotational point thereby releasing the locking pin allowing the cross arm to be moved from the stowed to the unstowed configuration folding the multicopter by first folding the main arm to a stowed configuration and then folding the cross arms into a stowed position wherein the locking pin on the cross arm engages with the locking slot to lock the flight arms in a stowed configuration, and unfolding the multicopter by releasing the locking pin from the locking slot my movement of the lever such as to release the cross arm to an operation configuration, and then unfolding the main arm to an operational configuration.

Any one or more of the following embodiments may relate to any of the above aspects.

In one configuration the hub comprises a flight controller. Preferably the flight controller includes avionics control.

In one configuration the multicopter comprises two or more communication devices, each communication device located on a different flight arm.

In one configuration the hub has an elongate axis orthogonal to the horizontal plane of the flight arms when the multicopter is in the operational state.

In one configuration the hub has an elongate axis in the horizontal plane of the flight arms when the multicopter is in the operational state.

In one configuration hub may comprise i) a battery, ii) a payload, or iii) a battery and a payload.

In one configuration when in the folded state, the elongate axis (i.e. the main axis) of the hub, the flight arms and the main arm are all aligned.

In one configuration the hub comprises at least one connector on its surface.

In one configuration the hub comprises side walls along its main elongate axis, and end walls.

In one configuration the connector is located on i) an end wall, ii) both end walls iii) one or more side walls, or iv) any combination of one or more of (i) to (iiii).

In one configuration the main arm pivoting connection attaches to, or extends from, a side wall of the hub.

In one configuration the main arm pivoting connection attaches to, or extends from, opposing side walls of the hub.

In one configuration the main arm pivoting connection is formed integrally with the hub.

In one configuration the main arm pivoting connection is adapted to provide for a hingable connection to allow about 70, 75, 80, 85, 90, 95, 100, 105 or 1100 rotation of the main arm in one Cartesian axis, and useful ranges may be selected between any of these values.

In one configuration the main arm pivoting connection is adapted to provide for a hingable connection to allow about 90 rotation of the main arm in one Cartesian axis.

In one configuration the main arm pivoting connection is adapted to provide for a hingable connection to allow movement of the main arm in two Cartesian axis.

In one configuration the main arm pivoting connection is adapted to provide for a hingable connection that allows about 900 rotation of the main arm in each of two Cartesian axis.

In one configuration the length of the main arm is less than the length of the hub in its main elongate axis.

In one configuration the length of the main arm intersects the flight arm to provide the two cross arms.

In one configuration the each cross arm connects to the main arm with a hingable connection to allow 70, 75, 80, 85, 90, 95, 100, 105 or 1100 rotation of the cross arm in one Cartesian axis, and useful ranges may be selected between any of these values.

In one configuration the each cross arm connects to the main arm with a hingable connection to allow about 90□ rotation of the cross arm in one Cartesian axis.

In one configuration the length of the hub in its main elongate axis is less than the length of a cross arm.

In one configuration one or more communication devices are located at or on the intersection between the cross arm and the main arm.

In one configuration the multicopter has one or more payloads mounted at the intersection between the cross arm and the main arm.

In one configuration the multicopter has one or more payloads mounted on the main arm.

In one configuration the multicopter has at least two payloads, and wherein at least two of the payloads are located on separate flight arms.

In one configuration, when the multicopter is in the stowed state, the elongate axis of each of the main arm and cross arms are adjacently aligned.

In one configuration the main arm is sandwiched by the cross arms when in the stowed state.

In one configuration the main arm and cross arms form an "M"-shape when in the stowed state.

In one configuration, when the multicopter is in the stowed state, the main arm and cross arms form an "M"-shape and wherein the main arm extends for a portion of the length of the cross arms.

In one configuration the motors are located at the distal end of each cross arm (relative to their connection to the main arm).

In one configuration the motors comprise a housing and wherein the width of each housing is less than half of the distance between the two cross arms when in the stowed state.

In one configuration the flight arms in the stowed state arms are substantially parallel to each other in the vertical axis.

In one configuration the flight arms in the stowed state arms are substantially parallel to each other in the horizontal axis.

In one configuration the multicopter comprises at least one clamp adjacent a pivoting point, such that the clamp secures the arms in the deployed state.

In one configuration the clamps are compression clamps.

In one configuration the clamps are moveable along the arms when disengaged to allow stowing of the multicopter.

In one configuration the landing gear extends pivotably from the hub. In one configuration the landing gears extending from the hub are "V"-shaped when in the deployed configuration.

In an alternate configuration the landing gears extend from the hub and the flight arms.

In an alternate configuration the landing gears extend from the flight arms.

In one configuration the landing gear extends from the cross arm pivoting connection.

In one configuration the landing gear is adapted to fold against a flight of arm, such that the landing gear is substantially parallel to the flight arm when in the stowed state.

In one configuration the landing gear is adapted to fold against a main arm, such that the landing gear is substantially parallel to the main arm when in the stowed state.

In one configuration, the landing gears are attached to the intersection between the main arm and cross arms via a pivoting connection.

In one configuration, the landing gears have a "T"-shape, "Y"-shape, or "V" shape.

In one configuration, the landing gears can be folded or unfolded manually.

In one configuration, the landing gears can be remotely pivoted using a motor or a servo toward the hub to i) transition the multicopter to a stowed state, and/or i) to provide 360□ clearance for a bottom mounted camera in the deployed or operational state.

In one configuration, when the multicopter is in the stowed state, the elongate axis of each of the main arm, cross arms, and the landing gears are adjacently aligned.

In one configuration, when the multicopter is in the stowed state, the main arm and folded landing gears form an "M"-shape.

In one configuration the volume of the multicopter when in the stowed state is less than 5, 6, 7, 8, 9, 10, 11, 12% of the volume of the multicopter when in the operational state, and useful ranges may be selected between any of these values.

In one configuration the volume of the multicopter, when comprising the battery, in the stowed state is less than 5, 6, 7, 8, 9, 10, 11, 12% of the volume of the multicopter when in the operational state, and useful ranges may be selected between any of these values.

In one configuration the volume of the multicopter, the multicopter comprising the battery and at least one payload, in the stowed state is less than 5, 6, 7, 8, 9, 10, 11, 12% of the volume of the multicopter when in the operational state, and useful ranges may be selected between any of these values.

In one configuration the volume of the multicopter, the multicopter comprising the battery and at least one payload and at least two communication devices, in the stowed state is less than 5, 6, 7, 8, 9, 10, 11, 12% of the volume of the multicopter when in the operational state, and useful ranges may be selected between any of these values.

In one configuration the battery provides the mounting structure for payload.

In one configuration the notional polyhedron has sufficient volume to at least partially contain a battery.

In one configuration the notional polyhedron has sufficient volume to contain a battery.

In one configuration the multicopter comprises a locking member.

In one configuration, when converting the multicopter from a stowed configuration to an unstowed configuration the cross arms are rotated to an unstowed configuration before the main arm is rotated to an unstowed configuration.

In one configuration the locking member restricts the order of movement of the flight arms between a stowed and unstowed configuration.

In one configuration, when stowing the multicopter the locking member permits movement of a cross arm if the associated main arm is already in the stowed position.

In one configuration, when unstowing the multicopter the main arm can only be unstowed if the associated cross arm(s) are already in the unstowed position.

In one configuration the locking member comprises two locking mechanisms: being a left and a right mechanism to lock the two cross arms.

In one configuration each locking mechanism comprises a first portion and a second portion.

In one configuration the locking member comprises a central portion for attachment to the hub or the battery.

In one configuration each locking mechanism comprises a release lever as the second portion that can be actuated by the user to release the lock on the first portion of the locking mechanism.

In one configuration the lock of the locking mechanism comprises a locking slot on the first portion that can be rotated about a rotational axis by movement of the release lever also about a rotational axis.

In one configuration the cross arm of the flight arm comprises a locking pin that corresponds to the locking slot.

In one configuration movement of the locking lever about the rotational point rotates the locking slot about its rotational point thereby releasing the locking pin allowing the cross arm to be moved from the stowed to the unstowed configuration.

In one configuration the second portion comprises a cam that operates against the first portion to cause rotational movement of the first portion about its rotational point.

In one configuration the first portion and second portion comprise a biasing means that biases the release lever and the locking slot into the locking configuration In one configuration the locking pin comprises an enlarged end that prevents the locking pin being pulled out of the locking slot.

In one configuration the locking pin prevents movement of the locking pin in the x-axis relative to the locking member.

As used herein the term "multicopter" and its grammatical equivalents refers to a unmanned aerial vehicle (UAV) that has multiple rotors. Examples of multicopters include quadcopters that have four rotors (either singularly or as a coaxial pair of eight rotors), hexacopters which have six rotors (either singularly or as a coaxial pair of 12 rotors), or octocopters which have eight rotors (either singularly or as a coaxial pair of 16 rotors).

As used herein, the term "substantially" and its grammatical equivalents means greater than 75%, or greater than 80% or greater than 85%, or greater than 90% or greater than 95%.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

Embodiments described herein can also be said broadly to relate to the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

BRIEF DESCRIPTION OF THE DRAWINGS

FIG. 1 shows a multicopter in a deployed state with the landing gear in a folded state.

FIG. 2A shows a multicopter of FIG. 1 in a partially stowed state.

FIG. 2B shows an enlarged view of a main arm pivot.

DETAILED DESCRIPTION OF THE INVENTION

Figure 3:
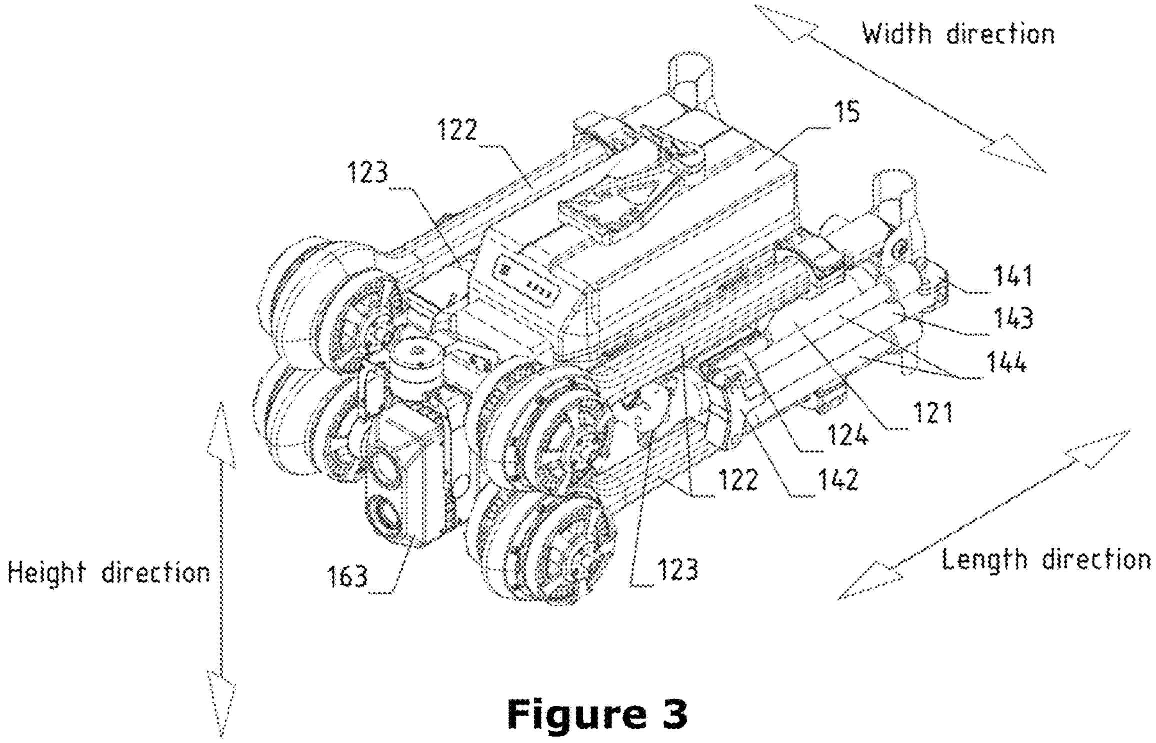
FIG. 3 shows a multicopter of FIG. 1 in a stowed state.

Described is a multicopter 10 that is foldable between a stowed state and an operational state. The multicopter 10 comprising at least a hub 11 and is configured to receive one or more payloads and a battery 15. The multicopter 10 comprises two or more flight arms 12 that extend substantially horizontally when in the operational state, each flight arm 12 comprising a main arm 121 that each extend from the hub at a main arm connector 123, and two cross arms 122 that extend from the main arm 121 at a cross arm connector 126, the main arm connector 123 adapted to allow each of the main arms 121 to pivot towards each other to a stowed state. Each of the flight arms in the stowed state may locate substantially parallel to each other, the cross arm connector 126 adapted to allow each of the cross arms 122 to rotate towards the main arm 121 to a stowed state. The multicopter 10 may include two or more communication devices each located on a different flight arm 12.

In the stowed state the flight arms may define a notional polyhedron, the notional polyhedron having sufficient volume to contain one or more payloads and the communications devices, and to at least partially contain the battery 15.

The stowed state has a lower storage volume than the operational state, and the stowed state is configured such that important features and components, such as landing gear, payloads (such as cameras), and/or sensors/communication devices (such as GPS and antenna), are generally protected.

The multicopter 10 as described may provide a portable, large-sized multicopter 10 having:

- improved flight time and payload 30 capacity, and/or
- optimal placement of sensors in both ready-to-fly and folded states.

The portability of the multicopter 10 as described may be similar to smaller drones.

A challenge provided by multicopter 10 is how to fold (i) the arms, and (ii) the landing gears tightly around the hub 11. Many multicopters have removable landing gears 14 to make the folding easier. However, these configurations may mean that the flight arms 12 do not fold directly against the hub, and may instead have an intermediate arm portion that connects from the hub to the flight arms such that the point of rotation of the flight arms is spaced from the hub. This prevents tight folding of the flights arms against the hub. As discussed below, the hub 11 may contain the various avionics componentry. The flight arms 12 and landing gear 14 are typically multiple times longer than the side of the hub 11. Hence a challenge is to fold the flight arms 12 and landing gear 14 about the hub 11 reducing the amount of wasted hollow space(s).

With reference to FIG. 1A, the multicopter 10 comprises a hub 11, and two or more flight arms 12. Each flight arm 12 extends from the hub 11 via a main arm 121. The main arm 121 intersects the flight arm 122.

The hub 11 may have a main axis that is substantially horizontal relative to the flight arms 12. That is, the main axis of the hub 11 may be in the same plane to the flight arms 12. Alternately, the hub 11 may have a main axis that is substantially orthogonal relative to the fight arms 12. That is, the main axis of the hub 11 may be in a plane orthogonal to that of the flight arms 12. The hub may also support or comprise one or more payloads 30, a battery 15, and landing gear 14.

The hub 11 may also house a flight controller. A flight controller comprises an electronic system that contains software and hardware elements that allow the multicopter 10 to be remotely controlled (i.e. the avionics or at least a part thereof). The flight controller includes one or more processors that communicate with one or more sensors 16, such as a GPS receiver. The multicopter 10 may comprise one or more sensors 16. The sensors may comprise components such as a GPS antenna 161, data antenna 162, gimballed camera 163 and compass 164. The flight computer may include one or more electronic boards and/or a computer. The flight computer may include one or more sensors selected from accelerometers, rate gyros, barometric altitude, airspeed sensors or a combination of two or more.

The hub, containing the flight controller (i.e. the avionics or at least a part thereof) can be of a relatively small size. The hub may include the flight controller, power distribution, embedded computer, digital transmission module and the GPS. The avionics may, for example, fit within a cavity formed within the hub measuring 20 cm by 20 cm by 10 cm. The size of the hub cavity to contain the avionics may remain the same regardless of the size of the multicopter 10 airframe. i.e. the size of the hub cavity to contain the avionics may remain the same regardless of where a flight arm has a length of 20 cm, 60 cm, or 200 cm.

In some configurations the length of the hub in its longest dimension may be about 10, 20, 30, 40, 50, 60, 70 or 80 cm, and useful ranges may be selected between any of these values.

The hub 11 may comprise a central body, or a base, from which various components are attached. For example, the hub may connect to any one or more of the main arms 121, battery 15 or battery casing, payload 30 or a combination of any two or more.

In some embodiments the hub 11 may connect to the landing gear.

The hub 11 may comprise any suitable polygonal shape such as a cube, a square prism, a hexagonal prism, an octagonal prism, or a cylinder. The hub may generally comprise a polygonal shape having a top surface, a bottom surface, and side surface(s) that define a volume. The flight controller may be located within the hub volume.

The hub 11 may have a configuration in which the main axis (i.e. axis of longest length when including a battery 15) is in the horizontal plane (i.e. parallel to the plane formed by main arms 121 and the cross arms 122 when in the deployed configuration). The surfaces of the hub 11 provides mounting locations for the components of the multicopter 10. For example, the main arms 121 may be coupled to the side surfaces of the hub 11 respectively (such that at least two main arms 121 are diametrically opposed in the width direction), the battery 15 may be coupled to the top surface, and the payload 30 may be mounted on the front, back and bottom surfaces.

Alternatively, the hub may have a configuration in which the main axis (i.e. axis of longest length when including battery) is in a vertical plane (i.e. perpendicular to the plane formed by main arms 121 and the cross arms 122 when in the deployed configuration). The surfaces of the hub 11 provides mounting locations for the components of the multicopter 10. For example, the main arms 121 may be coupled to the side surfaces of the hub 11 respectively (such that least two main arms 121 are diametrically opposed in the width direction), the battery 15 may be coupled to the top surface, and the payload 30 may be mounted on the front, back and bottom surfaces.

Alternatively, the hub 11 may have a polyhedral shape that extends in the horizontal plane (i.e. relative to the flight arms 122 and main arms 121 when in the deployed configuration). The thickness (i.e. depth) of the hub 11 may be much less in the vertical axis relative to the horizontal axis.

Figure 11:
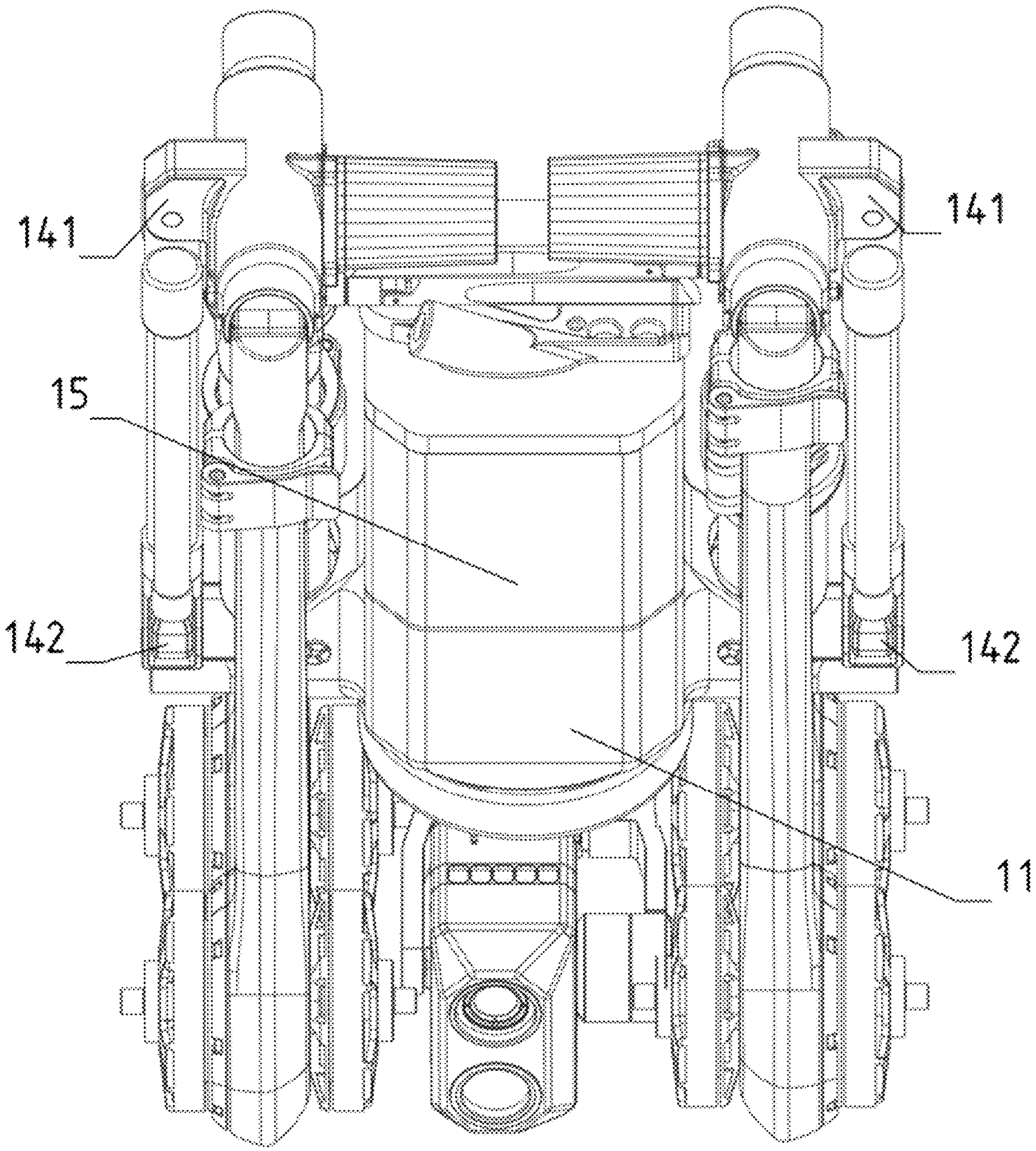
FIG. 11 shows a bottom view of a multicopter of FIG. 9 in a stowed state.

The multicopter 10 may comprise a battery 15 that provides a source of power for the multicopter 10 motors. The battery 15 may attach to a surface of the hub 11. As shown in FIG. 1, where the hub 11 has a horizontal configuration (longest axis in the horizontal axis), the battery 15 may attach to a surface of the hub 11 on the longest axis of the hub. As shown in FIG. 11, where the hub 11 has a vertical configuration (longest axis in the vertical axis), the battery may attach to a surface of the hub 11 on the shortest axis of the hub 11.

The battery 15 may include one or more mounting brackets on a surface of the battery 15. The mounting bracket may be based on a clip, friction fit, screw mount or clamp. The mounting bracket may be a quick release bracket. The bracket provides for mounting one or more payloads on battery 15 directly. This design allows a user to mount a payload 30 directly on the battery 15 without carrying the weight of a separate mounting structure.

The battery 15 may comprise any suitable rechargeable battery including but not limited to lithium polymer batteries. The battery may have a capacity of about 20000, 25000, 30000, 35000, 40000, 45000 or 500000 mAh, and useful ranges may be selected between any of these values. In some embodiments, the battery may be a removable battery.

The battery 15 may be formed integrally with the hub 11. The battery 15 may be provided within a cavity of the hub 11. The removable battery may be provided within a casing for the battery 15. The casing for the battery 15 may be configured to be detachably coupled to the hub 11. The casing may attach to the hub 11, or be formed unitary with the hub 11. The casing for the battery 15 may form as an at least partial surround for the battery 15. The casing for the battery 15 may assist in locating or supporting the battery 15 on the hub 11. In some configurations the casing for the battery 15 may extend the length of the battery 15, or at least a majority of the length of the battery 15. In one embodiment, the casing for the battery 15 defines an external appearance of the multicopter 10 when the casing for the battery 15 is attached to the hub 11. In one embodiment, the casing for the battery 15 may be wholly or partially received within the hub 11.

In some embodiments, the casing for the battery 15 is coupled to a top surface of the hub 11. In other embodiments, the casing for the battery 15 is coupled to a bottom surface of the hub 11.

The casing for the battery 15 may include one or more mounting brackets on a surface of the casing. The mounting bracket may be based on a clip, friction fit, screw mount or clamp. The mounting bracket may be a quick release bracket. The bracket provides for mounting one or more payloads on the casing for the battery 15.

The mounting system (for the battery 15 or casing for the battery 15) may broadly comprise a first portion associated with the hub 11 that couples with a corresponding second portion (provided to the payload) to fix the payload 30 to the hub 11. The mounting system may comprise a quick release mechanism that allows the payload 30 to be decoupled from the hub 11 using a button, a lever or a slider. In some embodiments, the mounting system may be electronically and/or remotely decoupled.

The mounting system may be a shoe mounting system comprising a shoe or bracket provided to the hub 11 and a corresponding foot on the payload 30 or other accessory. For example, the mounting system may comprise a hot shoe mount which comprises a conductive surface to enable an electrical and/or data connection between the payload 30 and the hub.

Payloads may be coupled to the multicopter 10 at various locations including but not limited to the hub 11, the battery 15, the casing for the battery 15, the main arms, the flight arms, and/or the landing gear 14.

The payload 30 may comprise any load capable being carried by the multicopter 10 including but not limited to sensors, audio devices, and/or light emitting devices.

In some embodiments, the payload 30 may be mounted on a gimbal or gyro-stabiliser.

The sensor may comprise an optical sensor including but not limited to a camera, an infrared camera, thermal camera, multi-spectral cameras, hyperspectral cameras and/or night vision camera. Other examples of sensors include, laser rangefinders, lidars, and laser scanners.

The audio device may comprise a microphone, and/or a speaker.

The light emitting device may be a light emitting diode (LED) based device. The light emitting device may comprise a spotlight, a warning light, Each payload 30 may be coupled to the hub, flight arm, and/or the battery casing via a mounting system, for example, such as the mounting system described above.

The landing gear 14 may comprise any structure suitable of supporting the multicopter 10 while on the ground.

The landing gear 14 may comprise two or more legs. Each leg may comprise a stabilising structure such as feet or wheels. In some embodiments, a skid may be provided between a pair of legs.

The landing gear 14 may be mounted to landing gear 14 mounting points on the hub 11, the flight arms, and/or the battery casing. Where the casing for the battery 15 is coupled to the bottom surface of the hub 11, the casing for the battery 15 may comprise landing gear 14 mounting points. The landing gear 14 may be integrally formed with the hub 11, the flight arms 12 or the casing for the battery 15.

The landing gear 14 may be foldable or retractable as shown in FIGS. 1, 2A and 17 to 20. Foldable or retractable landing gear 14 may be beneficial to prevent or reduce blockage of downward air thrust generated by rotors during flight. If the downward air thrust generated by the rotors is blocked, even partially, then this can reduce lift efficiency.

As shown in FIG. 1 the landing gears may be mounted on the flight arms 12. In particular, the landing gear 14 may be mounted at the intersection of the main arm 121 and cross arms 122. The arms may form a variety of shapes such as "T"-shape, "Y"-shape, or "V" shape.

Figure 16:
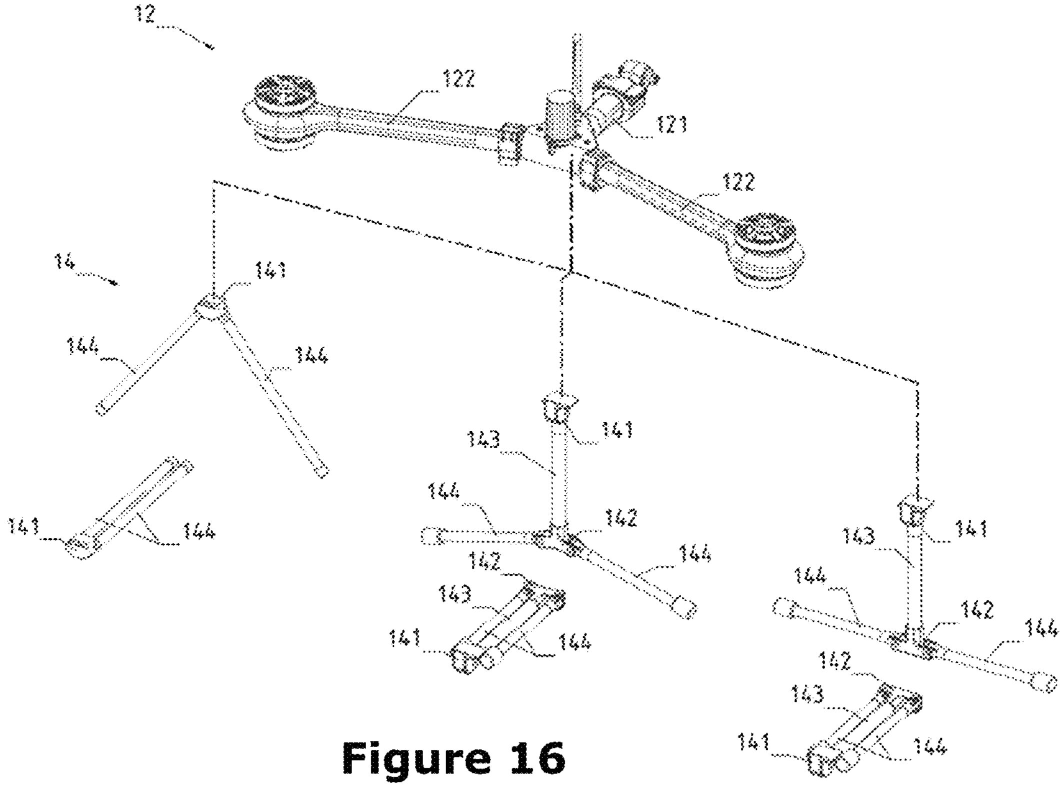
FIG. 16 show landing gear configurations.
Figure 17:
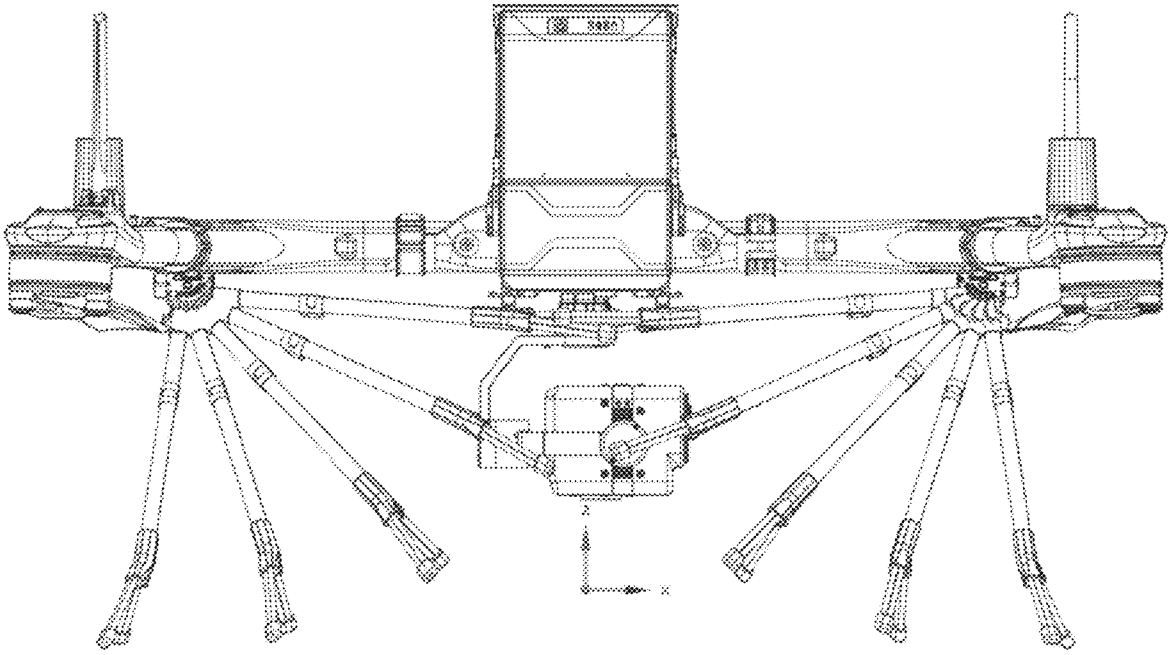
FIG. 17 shows a side-on view of a multicopter with the landing gear shown in 5 different positions from unstowed to stowed.
Figure 18:
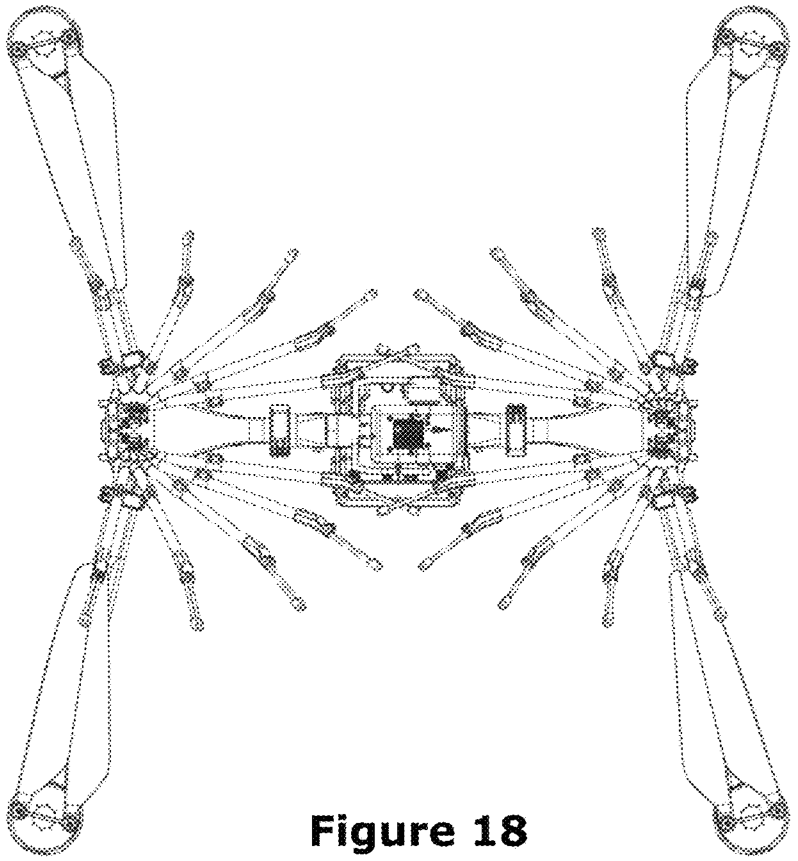
FIG. 18 shows a top (or plan) view of a multicopter with the landing gear shown in 5 different positions from unstowed to stowed.

Various landing gear 14 designs are shown in FIG. 16. FIG. 16A shows a "T"-shaped design. FIG. 16B shows a "Y"-shaped design. FIG. 16C shows a "V"-shaped design. The various folding designs may allow the arm components (143 and 144) of the landing gear 14 to fold towards the hub allowing the landing gear 14 to nest under the main arm 121. The "Y"-shaped design may comprise two arms 144 joined at a landing gear mounting point 141. The landing gear mounting point 141 may then attach to the underside of a flight arm 12. The landing gear mounting point 141 may comprise a pivot point or hinge to allow the two arms 144 to fold against the main arm 121. Alternately, the landing gear mounting point 141 may comprise a pivot point or hinge to allow the two arms 144 to fold against the cross arms 122.

In one embodiment, as shown in FIGS. 17 to 20, the landing gear 14 is attached to the region where the cross arm 122 and the main arm 121 intersect and the landing gear 14 folds up to be adjacent and parallel the main arm 121 when in the flying state. As shown in FIG. 16 the landing gear may connect to the underside of the connector that acts as a connection point for the main arm 121 and the cross arms 122. The landing gear 14 is effectively concealed against the main arm 121 and does not impinge upon the downward thrust generated by the rotors. The landing gear may be attached to the region where the cross arm 122 and the main arm 121 intersect via a mounting point 141 that provides a pivot point or hinge to allow the two arms 144 to fold against the main arm 121 to provide for the concealed landing gear while flying.

Figure 19:
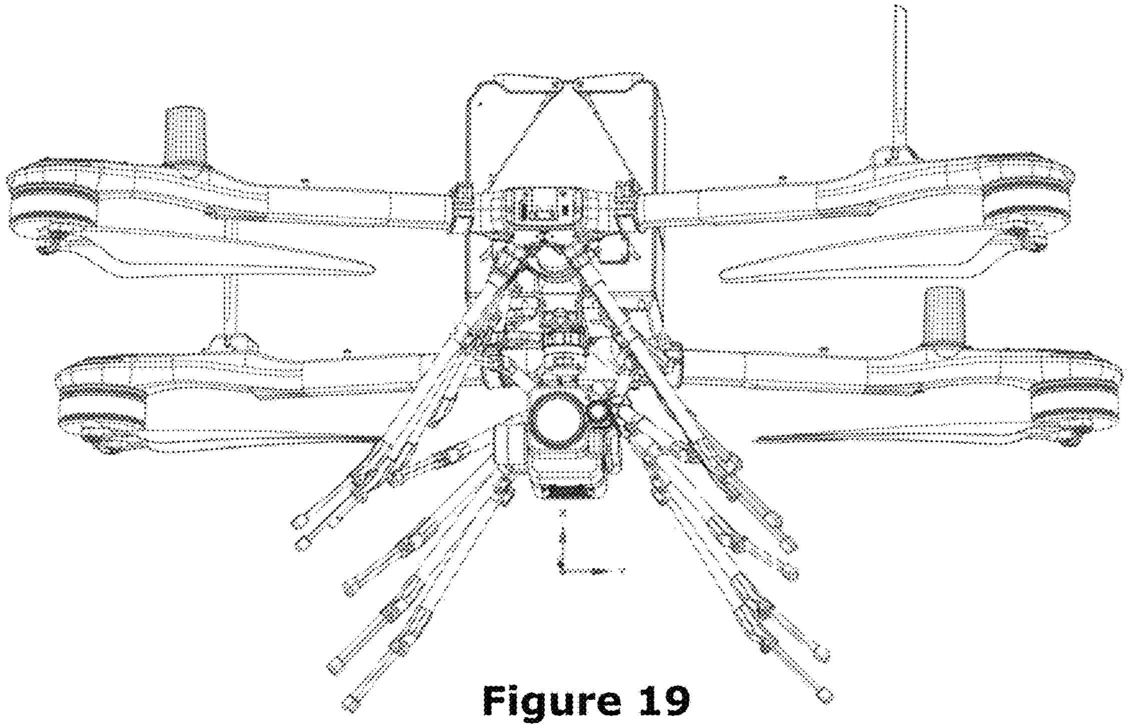
FIG. 19 shows a bottom perspective view of a multicopter with the landing gear shown in 5 different positions from unstowed to stowed.
Figure 20:
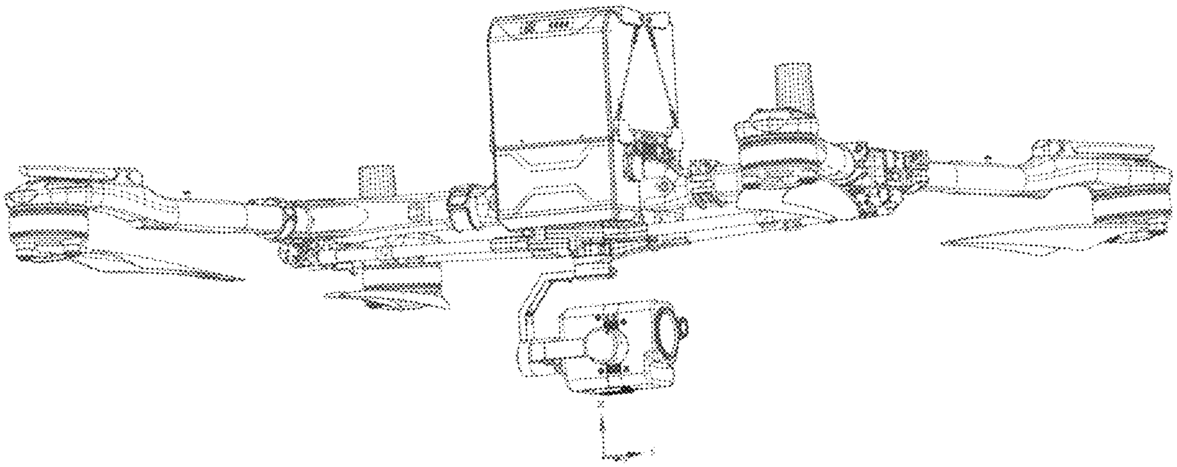
FIG. 20 shows a side view of a multicopter with the legs of the landing gear stowed adjacent the main arm.

The mounting point 141 may comprise a pivot point 142 or hinge connected to one or more motors or servomechanisms ("servos") that control the pivoting or hinging of the landing gear between the deployed and stowed state. The one or more motors or servos may be controlled remotely or manually. The one or more motors or servos may be controlled by a controller that is part of, or electrically connected to, the flight computer. The landing gears may therefore be switched remotely or manually between a fully deployed state to allow landing and a stowed state for flying. As shown in FIGS. 17 to 20 the landing gear 14 may pivot from a pivot point 142 located in the zone where the cross arm 122 connects to the main arm 121, and pivots to be adjacent the main arm 121. The pivoting of each leg of the landing gear 14 may be in two Cartesian axis at the same time. That is, when looking at the multicopter 10 side-on as in FIG. 17, the legs of the landing gear 14 move in the y-axis (up and down) and in the z-axis (forward or backwards) at the same time. This can be seen from the FIGS. 17 to 19 which show the movement of the legs of the landing gear 14 in five different positions from a side-on view (FIG. 17), top view (FIG. 18) and a bottom perspective view (FIG. 19). FIG. 20 shows the multicopter 10 with the legs of the landing gear 14 stowed adjacent the main arm 121.

Movement of the legs of the landing gear 14 in two Cartesian axis simultaneously may assist in preventing the landing gear 14 from contacting a sensor 16 located under the multicopter 10. For example, as shown in FIGS. 17 to 20 the sensor 16 may be a gimballed camera 162 located under the hub 11 of the multicopter 10.

Figure 14:
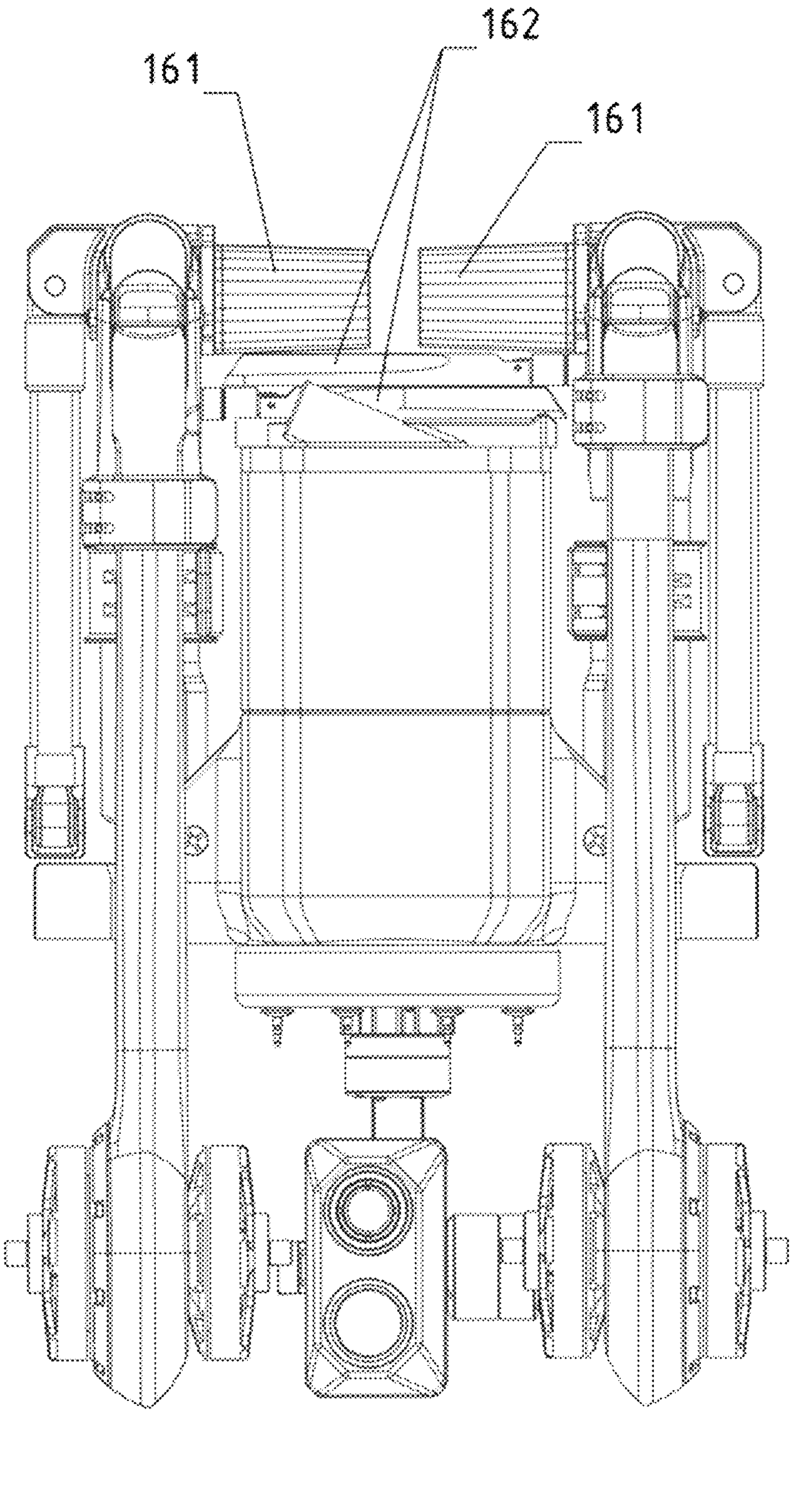
FIG. 14 shows a multicopter with a camera payload in a stowed state.
Figure 15:
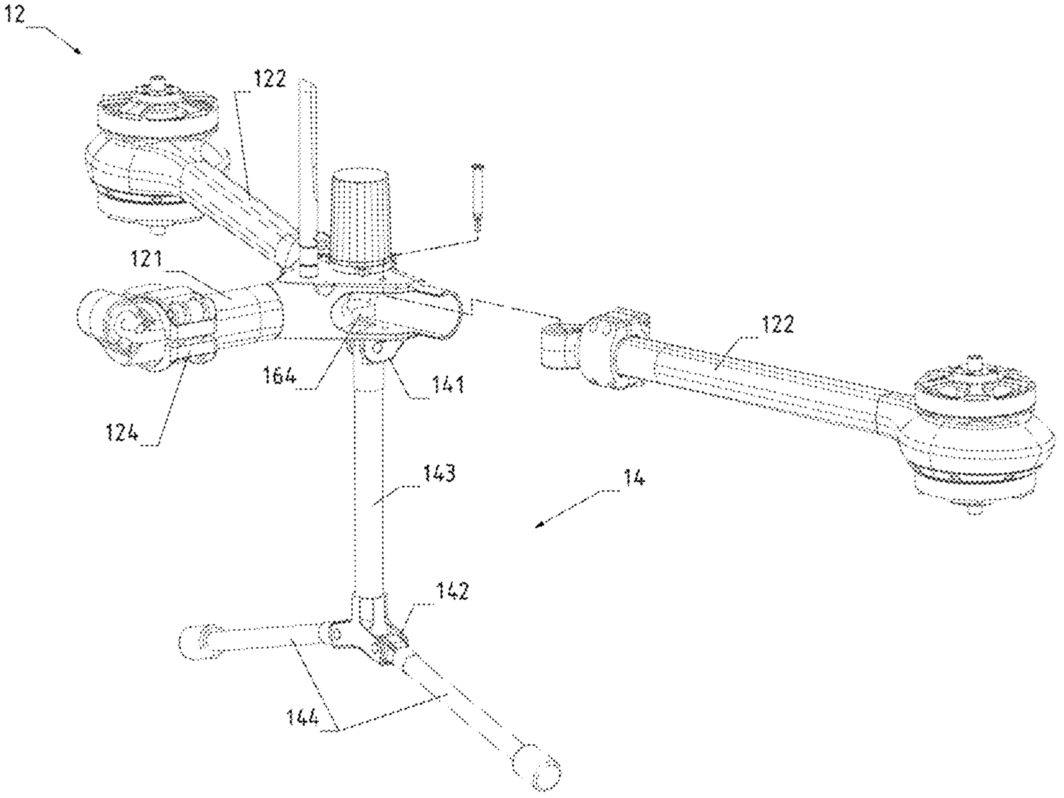
FIG. 15 shows a landing gear configuration.

As shown in FIGS. 14 and 15 the legs of the landing gear 14 may have a "Y"-shaped design, comprising comprise a vertical arm 143 connected at one end to a landing gear mounting point 141. Two other landing gear cross members 144 may attach to the distal end. The connection between the cross members 144 and the vertical arm 143 may be via a pivot point 142. This pivot point 142 may allow the cross arms 144 to fold up against the vertical arm 143 such that each of the landing gear 14 arm members (143 and 144) are parallel aligned.

The pivot point 142 for the cross arms 144 to fold up against the vertical arm 143 may include one or more motors or servos that control the pivoting or hinging of the landing gear cross arms 144 between the deployed and stowed state. The one or more motors or servos may be controlled remotely or manually. The one or more motors or servos may be controlled by a controller that is part of, or electrically connected to, the flight computer. The landing gears may therefore be switched remotely or manually between a fully deployed state to allow landing and a stowed state for flying.

The "V"-shaped design comprises two arm members attached to the landing gear mounting point 141. The landing gear mounting point 141 may comprise a pivot point to allow the two arms 144 to fold against the main arm 121. The pivot point for the two arms 144 allows them to fold together and to fold up against the main arm 121. This pivot may include one or more motors or servos that control the pivoting or hinging of the landing gear two arms 144 between the deployed and stowed state. The one or more motors or servos may be controlled remotely or manually. The one or more motors or servos may be controlled by a controller that is part of, or electrically connected to, the flight computer. The landing gears may therefore be switched remotely or manually between a fully deployed state to allow landing and a stowed state for flying.

It will be appreciated that the size of the landing gear may have to grow proportionally with the size of the multicopter 10's airframe. For example, a multicopter 10 having four motors (i.e. a quadcopter) with 80 cm rotors forms a square (defined by the four motors) having sides of about 100 cm in length. To ensure a stable landing, the side of the square formed by the four tips of the landing gears must be large enough, for example at least 55, 60, 65, 70, 75 or 80% of the side of the square, and useful ranges may be selected between any of these values.

The one or more motors referred to above may be an electric motor. The one or more servos referred to above may be electric, hydraulic or pneumatic servos. The motor or servos may provide rotary output to pivot the landing gear 14. The one or more motors or servos may include a transducer that determines the position of the landing gear 14 relative to the multicopter 10. The one or more motors or servos may include a governor that controls the speed of rotation of the landing gear 14.

Once in the folded state the arms of the landing gear 14 may align substantially parallel to the flight arms 12.

The landing gear 14 may fold up against the main arm 121 when flying, as previously explained, to provide for concealed landing gear that does not affect the downward force of the rotors. Likewise, when the multicopter 10 is stowed the landing gear 14 folds up against the main arm 121 such that it is substantially parallel to the main arm 121. Thus, when the landing gear is stowed (such as for flying) the landing gear 14 may fold up so that the landing gear extends from the mounting point 141 along the main arm 121 towards the hub 11.

When stowing the landing gear 14 for storage, the landing gear 14 may be folded manually. Likewise, when the multicopter 10 is prepared for the deployed state, the landing gear 14 may be deployed manually. Once flying the landing gear 14 may be stowed for flying remotely using the one or more motors or servos, as discussed.

The landing gear 14 arrangement may provide for:

i) improved aerodynamic performance by reducing any effect on lift generated by rotors during flight, ii) a 360□ field of view for both hub-mounted cameras and arm-mounted cameras, iii) a smaller footprint and protected landing gear 14 when the multicopter 10 is in the stowed state, or iv) any combination of one or more of (i) to (iii).

Each flight arm 12 comprises a main arm 121, and two cross arms 122. The main arms 121 extend from the hub 11, and the cross arms 122 extend from a distal end of each main arm 121.

The length of the flight arms 12 may have to grow proportionally with the size of the multicopter 10*s* airframe. In general the relationship can be defined as the flight arms (i.e. the main arm 121 and cross arms 122) having a length that is at least half the diameter of the rotor. For example, an airframe that uses 100 cm rotors must have flight arms longer than 50 cm (100 cm/$^2$) in order to provide enough clearance for the rotors relative to each other.

The proximal end (i.e. relative to the hub 11) of each main arm 121 may extend from one of the hub's 11 side surfaces. It will be appreciated however that each main arm 121 may alternatively extend from any other part of the hub 11. For instance, in one embodiment, each main arm 121 may extend from the casing for the battery 15. Alternately, the main arm 121 may extend from the underside of the hub 11.

The main arm 121, when in the deployed state, may extend from the hub 11 at an angle orthogonal to the side of the battery 15 or hub 11. This arrangement is shown in FIG. 1 since the angle between the main arm 121 and the side of the hub 11 or battery 15 15 is about 90□ in both the vertical and horizontal planes. The main arm 121 may extend at an angle other than 90□ in the horizontal plane. This may give the main arms 121 a "swept wing" style orientation relative to the hub 11. The main arm may extend from the hub 11 in the horizontal plane when in the deployed state at an angle of about 70, 75, 80 or 85□ on the horizontal plane.

It will be appreciated that the surface of the hub where each main arm connection is located may define a notional connection plane (for example, where the hub 11 surface is rounded or partially rounded.

It will also be appreciated that each main arm comprises a longitudinal axis. That is, the main arm may be an elongate rod having a longitudinal axis. The longitudinal axis of each main arm may intersect each respective notional connection plane of the hub at an angle of 70, 75, 80, 85 or 90□ relative to the horizontal and/or vertical planes.

Each main arm 121 may be rotatably connected to the hub 11 by a main arm connector 123. The main arm connector 123 may comprise several components. A component of the main arm connector 123 may be attachable to the hub 11. Alternately a component of the main arm connector 123 may be formed unitarily with the hub 11. The main arm connector 123 may be manufactured to be integral with the casing for the battery 15. The main arm connector 123 may be manufactured to be integral with the battery.

The connection of the main arm 121 to the main arm connector 123, which is directly connected or formed unitarily with the hub, allows the pivot point for the main arm 121 to be very close to the hub 11. This allows for efficient folding of the main arm 121, and thus also the cross arms 122, against the hub 11. In one embodiment the main arm 121 folds flush against the hub 11. The cross arms 122 may also fold flush against the hub 11. Thus, in one embodiment the main arm 121 and the cross arms 122 fold flush against the hub 11.

With the present invention, based on the pivot point for the main arm 121 being very close to the hub 11, due to the main arm connector 123 located on, or unitary, with the hub 11, there is no intermediate arm positioned between the main arm connector 123 and the hub 11. Again, this provides for flush folding of the flight arms 12 against the hub 11.

Where the main arm connector 123 is formed unitarily with the hub 11, there may be more than two main arm connector 123, which may allow a user to change the location that the main arm 121 is attached to the hub 11. The main arm connector 123 may each be located at discrete locations across or along the hub 11. For instance, each side surface may comprise two main arm connector 123 arranged substantially in horizontal alignment.

In another embodiment the hub 11 may comprise sliding rails to mount the main arm connectors 123. The sliding rail may allow the mounted main arm connector 123 to have its location adjusted (i.e. along the sliding rail). The sliding rail may comprise a lock to fix the position of the main arm connection at a given position on the sliding rail. The sliding rails may be located on any suitable surface of the hub 11, in any desired orientation. For instance, the sliding rails may be located on connection side surfaces of the hub 11. The sliding rail may be located on the casing for the battery 15.

The main arm connector 123 may connect to the hub 11 by a pivoting connection. It will be appreciated that the pivoting connection may refer to any connection that enables the main arm 121 to pivot around at least one axis, relative to the hub 11.

Figure 4:
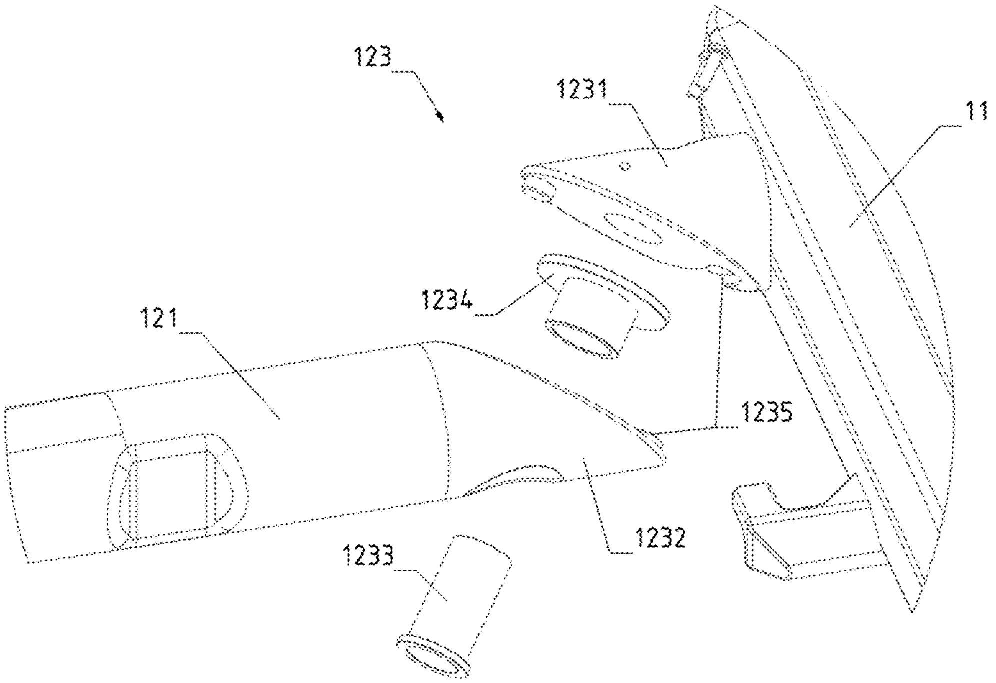
FIG. 4 shows an exploded view of a pivot joint.

FIG. 4 demonstrates a configuration of a main arm connector 123. The main arm connector 123 has several components that cooperate together to allow for rotation of the main arm 121. The main arm connector 123 as shown in FIG. 4 includes a connector base 1231 that locates on the hub 11. The connector base 1231 may be attachable to the hub 11 or may be formed unitary with the hub 11. The connector base 1231 has a rotating surface 1231*a* that corresponds to a rotating surface 1232*a* of the main arm connector element 1232. The main arm connector element 1232 may be formed unitary with the main arm 121 or formed as an attachment to the main arm 121.

The main arm connector 123 may include a coupling element having a first part 1233 and second part 1234 whereby the first 1233 and second 1234 parts couple together. Each of the two parts of the coupling element are located with to either the main arm connector element 1232 or the connector base 1231. That is, as shown in FIG. 4 the first coupling element 1233 is located in the main arm connector element 1232 and the second coupling element 1234 is located in the connector base 1231. As shown, the main arm connector element 1232 may include an aperture through which the first coupling element 1233 is located to engage with the second coupling element 1234 when the main arm 121 is attached to the connector base 1231. The first coupling element 1233 may be in the form of a rod or tube that extends between the main arm connector element 1232 and the connector base 1231. The first coupling element 1233 may then define the axis (or pivot point) around which the main arm rotates relative to the hub 11.

The first coupling element 1233 comprises a proximal end that is closer to the hub 11, and a distal end that is closer to the flight arms. In some embodiments the proximal end and distal end may be separable/discrete members that may be separably coupled together to form the pivot point. In other embodiments, the proximal end and the distal end may comprise parts of one single/integrated member.

The proximal end may be fixedly connected to the connector base 1231. The terminus of the proximal end may differ across different embodiments. For instance, in some embodiments the proximal end may extend through the connector base 1231, and the terminus of the proximal end may be located and fixed within an internal cavity of the connector base 1231. In another embodiment, the first coupling element 1233 may not extend through the connector base 1231, and instead the terminus of the proximal end may be fixed to the connector base 1231. In the latter embodiment, the terminus of the proximal end may comprise a plate that is formed orthogonally to the first coupling element 1233. The plate may therefore be parallel with the connector base 1231, and connect therein (probably need more about how it connects to the surface).

The main arm portion may be rotatably connected to the first coupling element 1233. The main arm connector element 1232 may comprise an internal cylindrical aperture that the distal end of the pivot point 1233 may occupy. In other words, the pivot point may extend orthogonally through the main arm connector element 1232. The terminus of the distal end of the pivot point may then extend through a back surface of the main arm connector element 1232. The terminus may comprise a lip/rim that is wider in circumference than the diameter of the internal cylindrical cavity (so that the main arm 121 and main arm connector element 1232 does not slide off).

The coupling elements may be a threaded coupling. That is, the threaded coupling may comprise a first threaded portion and a second threaded portion. The first threaded portion may be substantially hollow, and may comprise an opening and an internal surface. The internal surface may define an internal cavity, and the internal surface may comprise a threaded pattern. The second threaded portion may have an external surface, and may be sized and shaped so as to occupy the internal cavity such that the external surface contacts the internal surface of the first threaded portion. The external surface may comprise a threaded pattern that corresponds to the threaded pattern of the first threaded portion, such that when the second portion is entered into the internal cavity of the first threaded portion, and rotated, the second threaded portion may become securely fixed in the first portion. In one embodiment, the first threaded portion may be located on the hub 11 and the second threaded portion may be located on the terminus of the main arm 121. In another embodiment, the locations may be reversed.

In another embodiment the coupling elements may include a spring connection. It will be appreciated that spring connection may refer to any connection that may allow for separation through the biasing of a spring. For example, the spring connection may comprise an extension spring that biases the components of the main arm connector to the main arm. That is, when the main arm is rotated about the main arm connector the extension spring may bias the main arm 121 into a particular orientation, whether that is in the stowed state or operational state.

The main arm connector 123 may include one or more rotational stop elements. As shown in FIG. 4 these are in the form of a projection and corresponding slot that are located on the rotational surfaces 1231*a* and 1232*a* of the connector base 1231 and main arm element 1232 respectively. The rotational stop elements may act to limit the rotation of the main arm 121 and may assist in locking the main arm in place once in the deployed position.

It will be appreciated that in addition to the express examples provided, any other connection that securely, and separably/rotatably, fixes the main arm to the hub may be used. For example, the connection may be a ball and socket joint.

The relative angle of the rotating surface 1231*a* of the connector base 1231 and the rotating surface 1232*a* of the main arm connector element 1232 may define the rotational characteristics of the main arm 121 relative to the hub 11. For example, as seen in FIG. 4 the surfaces 1232*a* and 1231*a* form a 45□ angle relative to the main arm 121 axis. This allows for the main arm 121 to rotate simultaneously in two Cartesian axis (i.e. two degrees of freedom)—that is, 90□ in each of the two Cartesian axes. As shown in FIG. 2A, the main arm connector 123 provides for the main arm to rotate about its longitudinal axis 90□, and also rotate sideways 90□ such that it is stowed alongside the battery 15 as shown in FIG. 3.

Figure 12:
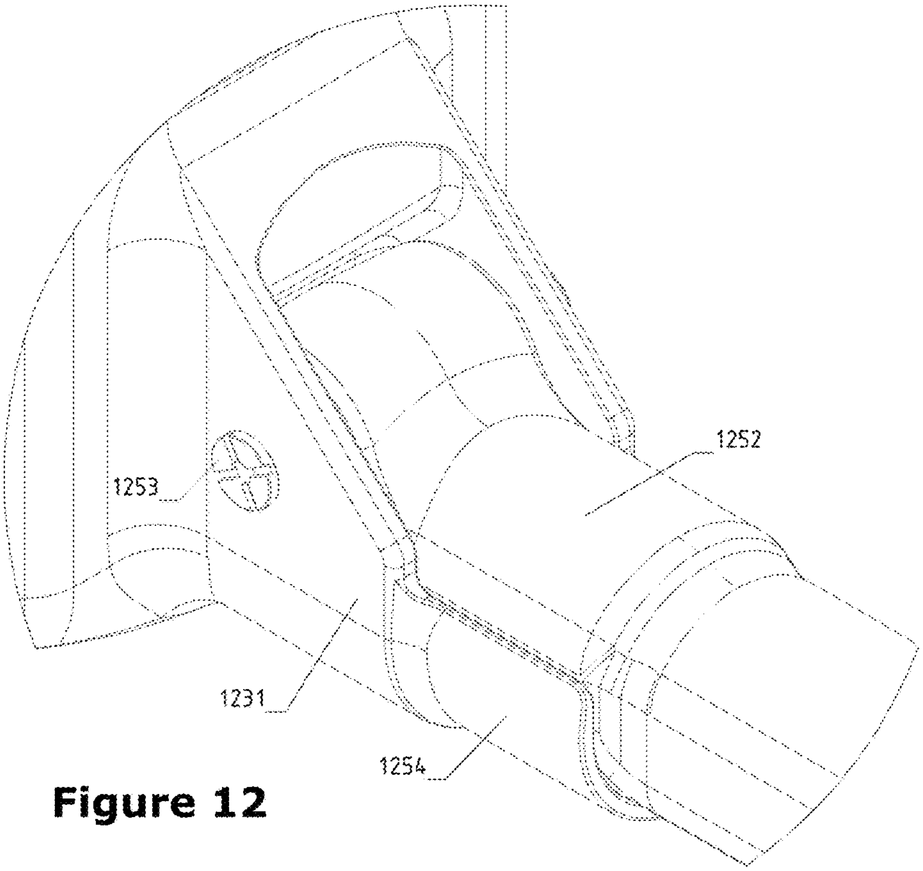
FIG. 12 shows a pivot joint.

FIG. 12 demonstrates a configuration of an alternative main arm connector 123 to that described above. The connector base 1231 may attach to the hub 11 or may be formed unitarily with the hub 11. The connector base 1231 may include a connection that provides for rotation of the main arm 121 in one Cartesian axis (i.e. one degree of freedom) relative to the hub 11. For example, as shown in FIG. 12 the main arm connector 123 provides for up to about 90□ rotation of the main arm 121 from the deployed state to the stowed state and vice versa.

The main arm connector 123 may be a revolute joint providing for one degree of freedom of rotation: rotational motion about a single axis. The main arm connector 123 may be in the form of a hinge. The hinge pin 1253 may locate through a distal portion of the main arm 121. The pin 1253 may define the axis of rotation of the main arm 121. The main arm connector 123 may be in the form of a pin joint. The pin may define the axis of rotation of the main arm 121. The pin 1253 may not penetrate all the way through the main arm, but may instead penetrate into an aperture in the main arm. Alternately the pin may pass full through the main arm 121. The main arm may include an enlarged portion at its distal end as shown in FIG. 12. For example, the main arm connector 123 may comprise two sides, and a terminus. The sides may be flat to correspond to the (internal) main faces of the connector base 1231. The main arm connector 123 may be rounded (to allow smooth/free rotation). The main arm connector 123 may further comprise an internal cylindrical cavity. The internal cylindrical cavity may be substantially straight, and it may have an opening at one side, and a closing at the other side.

Figure 13:
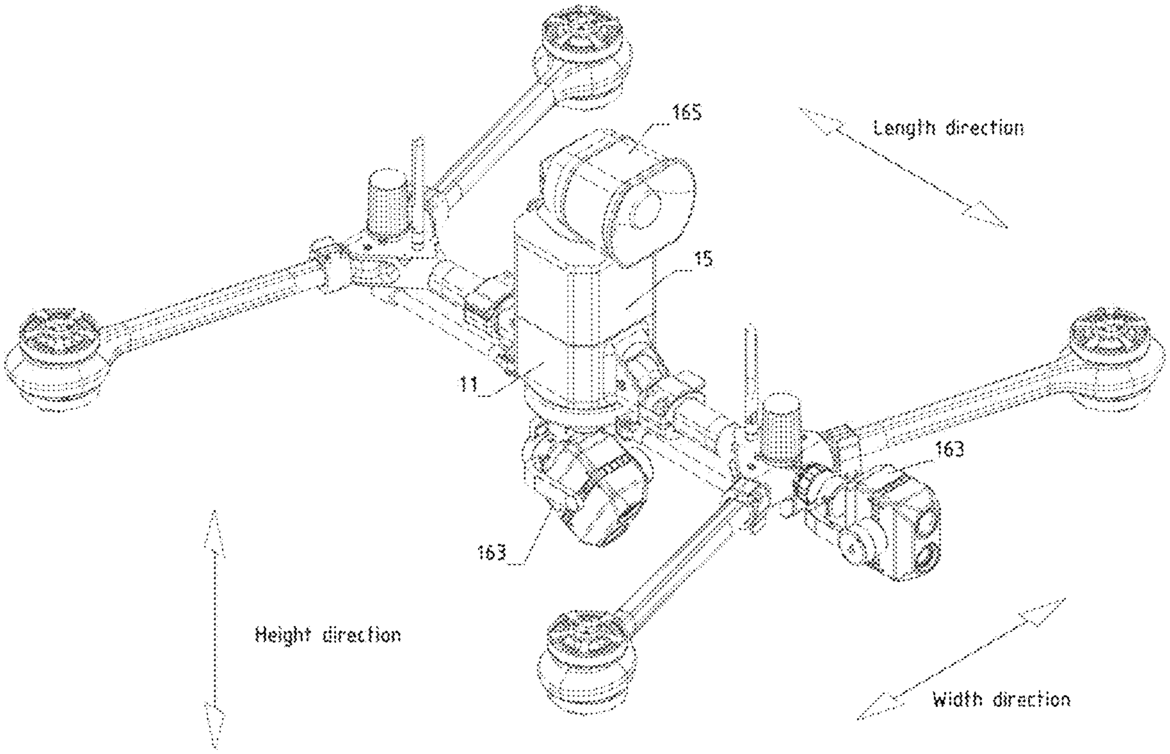
FIG. 13 shows a multicopter of FIG. 9 in a deployed state having multiple mounted payloads.

The main arm connector 123 may include a partial sleeve 1254 that extends out laterally from the main arm connector 123. The partial sleeve 1254 acts to restrict the movement of the main arm 121 by providing a stop for the main arm 121 so that it cannot rotate any further, and thus holds the main arm 121 in the desired deployed angle relative to the hub 11. The partial sleeve 1254 may have a dimeter slightly larger than that of the main arm 121 so that the main arm 121 seats in the partial sleeve 1254. As shown in FIGS. 13 and 14 the main arm connector 123 as a revolute joint folds the main arm 121 up against the battery 15 employing one degree of freedom of rotation. As shown in these figures the degree of rotation is about 90□, but it will be appreciated that the amount of rotation is sufficient to align the main arm 121 close to, or adjacent, the battery 15.

As shown in FIG. 12, the connector base 1231 may extend from a notional connection plane of the hub 11 and comprise two side walls, and a base. The side walls may comprise two main faces, two side faces, a top face, and a bottom face. The main faces may be substantially planar/flat, and have significantly greater surface area than the side faces and the top and bottom faces. The top face may be an inclined surface. The side walls of the connector base 1231 may extend orthogonally from the notional connection plane of the hub 11. That is, one side face may be coupled to the connection side surface of the hub, and the main faces may form substantially 90 degree angles with the connection side surface. The side walls may be positioned vertically; that is, the top face and the bottom face may be parallel with the xz plane (the ground), and the main faces may be substantially orthogonal to the xz plane. Each side wall may be spaced apart from the other in parallel alignment. Each side wall may also be provided in horizontal alignment that is the top face of each side wall is provided at the same height, and the bottom face of each side wall is provided at the same height. The base may be located in the xz plane between the bottom faces of each side wall. The nexus/intersection between the bottom and the side walls be either angular or rounded.

The, or each, main arm connector 123 may be located at a plurality of locations. For example, in one embodiment each main arm connector 123 may be located on the connection side surface of the hub 11. By way of further example, each main arm connector 123 may be located on the casing for the battery 15.

Each main arm connector 123 may be located on vertically opposite sides of the hub 11. That is, as shown in FIGS. 1 and 13 the multicopter 10 may comprise two main arms 121. In some embodiments the multicopter 10 may have 3 or 4 main arms 121, each main arm 121 having a pair of cross arms 122.

The distal end of the main arm 121 where it attaches to the cross arms 122 may serve as a mounting surface for sensors including but not limited to cameras, gimbals, antennas, lidars, radars, etc. The sensors may be mounted on the top surface, bottom surface, or side of the distal end of the main arm 121.

The cross arms 122 are located at the distal end of the main arm 121. The main arm 121 effectively transects the cross arms 122 to form a "T" or "Y"-shaped configuration.

A cross arm connector 126 attaches the cross arms 122 and the distal end of the main arm 121. The cross arms 122 may connect to the cross arm connector 126 with a joint hinge. The joint hinge may be a revolute hinge providing for about 90□ rotation about the hinge.

Each cross arm 122 connects to the cross arm connector 126 with a joint hinge that provides for the cross arm 122 to rotate in the same plane as the main arm 121. This can be seen in FIG. 9 whereby the cross arms 122 are rotated towards the main arm 121 to stack next to the main arm such that the cross arms 122 sandwich the main arm 121.

The cross arm connector 126 may be in the form of a hinge. A hinge pin may locate through a proximal portion of the cross arm 121 that engages the hinge of the cross arm connector 126. The pin defines the axis of rotation of the cross arm 122. The cross arm connector 126 may be in the form of a pin joint. The pin may define the axis of rotation of the cross arm 122. The pin may not penetrate all the way through the cross arm 122, but may instead penetrate into an aperture in the cross arm 122. Alternately the pin may pass fully through the cross arm 122. The cross arm 122 may include an enlarged portion at its proximal end as shown in FIG. 1. For example, the cross arm connector 126 may comprise two sides, and a terminus. The sides may be flat to correspond to the (internal) main faces of the enlarged portion of the proximal end of the cross arm 122 that engages the cross arm connector 126. The cross arm connector 126 may be rounded (to allow smooth/free rotation). The cross arm connector 126 may further comprise an internal cylindrical cavity. The internal cylindrical cavity may be substantially straight, and it may have an opening at one side, and a closing at the other side.

The cross arm connector 126 may include a partial sleeve that extends out laterally from the cross arm connector 126. The partial sleeve acts to restrict the movement of the cross arm 122 by providing a stop for the cross arm 122 so that it cannot rotate any further, and thus holds the cross arm 122 in the desired deployed angle relative to the hub 11. The partial sleeve may have a dimeter slightly larger than that of the cross arm 122 so that the cross arm 122 seats in the partial sleeve. As shown in FIG. 1 the cross arm connector 126 as a revolute joint folds the cross arm 122 up against the main arm 121 employing one degree of freedom of rotation. As shown in these figures the degree of rotation is about 90□, but it will be appreciated that the amount of rotation is sufficient to align the cross arm 122 close to, or adjacent, the main arm 121.

As mentioned above, the cross arms 122 extend either side of the main arm 121. Each cross arm 121 may be substantially the same length, or at least of uniform length.

The internal angle between each cross arm 122 and the main arm 121 may be about 90, 95, 100, 105, 110, 115, 120 or 135□, and useful ranges may be selected between any of these values.

The cross arms 122 each have a distal end which may comprise a motor 18. By being placed at the distal end of the cross arm 122 this allows for a maximum distance between each motor 18 thereby allowing the largest diameter rotor.

The rotor of the multicopter 10 may be an 18, 20, 25, 30, 35, 40, 45, 50, 55, 60, 65, 70, 75 or 80" rotor, and useful ranges may be selected between any of these values.

As a specific example, the multicopter 10 may comprise a 28", 30", 32", or 36" rotors. The lift of each 28" rotor ranges from 2.5 kg to 4 kg depending on the motors used. The lift of each 30" rotor ranges from 3.5 kg to 6 kg depending on motors used. The lift of each 32" rotor ranges from 5 kg to 8 kg depending on motors used. The lift of each 36" rotor ranges from 8 kg to 15 kg depending on motors used.

In some embodiments the flight arms 12 may further comprise communication devices 160. The communication devices may be for instance GPS, radio antenna etc.

It will be appreciated that communication devices offer optimal performance when provided in pairs, and when each member of the pair is maximally separated. In preferred embodiments therefore, the communication devices 160 may comprise at least one pair of communication devices **160*a*/160*b*, and each member of each pair 160*a*/160*b* may be provided on a separate flight arm 121 to ensure proper separation. For instance, in some embodiments, each member of each pair 160*a*/160*b* may be located on a separate cross arm pivoting connection 125**.

Current multicopter 10 designs lead to antennas being mounted on the main fuselage, particularly since vibrations caused by rotor movement with coaxial copters can interfere with the GPS antennas. There are benefits to place the RTK GPS antennas as far apart as possible for accuracy. The present design allows the antennas to be placed on opposing flight arms 12, particularly where the main arm 121 connects to the cross arms 121.

In some embodiments the flight arms may comprise one or more payloads, each coupled to the flight arms through respective payload 30 mounts. In further embodiments, the payload 30 mounts, and the respective payloads, may be located on a bottom side or front side of the cross arm pivoting connections.

The multicopter 10 may comprise multiple payloads. The payloads may be located in any one or more of

- the battery 15,
- the hub 11, and or
- the main arms 121, and or
- the region of the cross arms 122 where the cross arms join to the main arms 121.

In relation to the payloads extending from the hub 11 and battery 15, the payload 30 may extend from opposite ends. That is, when considering the major longitudinal axis of the hub 11 and battery 15 the payloads may extend from opposite ends. This where the hub 11 has a major axis in the vertical direction the payloads may extend from the top and bottom opposed surfaces of the hub 11 and battery 15. Where the payloads have their major longitudinal axis in the horizontal direction the payloads may extend from the front and rear opposing surfaces of the battery 15 and hub 11.

In relation to the region of the cross arms 122 where the cross arms join to the main arms 121, the payload 30 may extend from this region. For example the payload 30 may extend in the horizontal plane from this region. This allows the payload 30 to extend in a region where the payload 30 will not interfere with the rotors.

Locating the payload, in the form a camera, as discussed above may allow a greater field of view for the camera. For example, a camera mounted on the top of the battery 15 when in the vertical orientation may allow the camera an unobstructed field of view upwards. A camera mounted on the underside of the hub 11, when in the vertical orientation may allow an unobstructed field of view downwards. Where the main longitudinal axis of the hub 11 and battery 15 are in the horizontal plane, the camera connected to the front and rear will have an unobstructed field of view 90% from the ground to the sky. Likewise, for a camera connected to the region of the cross arms 122 where the cross arms join to the main arms 121 will have an unobstructed field of view 90% from the ground to the sky.

A camera with a field of view of up to 90% from the ground to the sky may be useful, such as to allow a camera to inspect an overhang structure, like the bottom surface of a bridge.

Flight arms may comprise a plurality of connection clamps. Connection clamps fitted at main arm pivoting connections and cross arm pivoting connections.

Connection clamps may have an open configuration and a closed configuration. In open configuration, the connections are able to rotate/permit rotating as described. In closed configuration, the connection clamps prevent any rotation at the connection; this thereby locks the flight arms at the desired orientation, be it in the stowed or operation mode.

Figure 5:
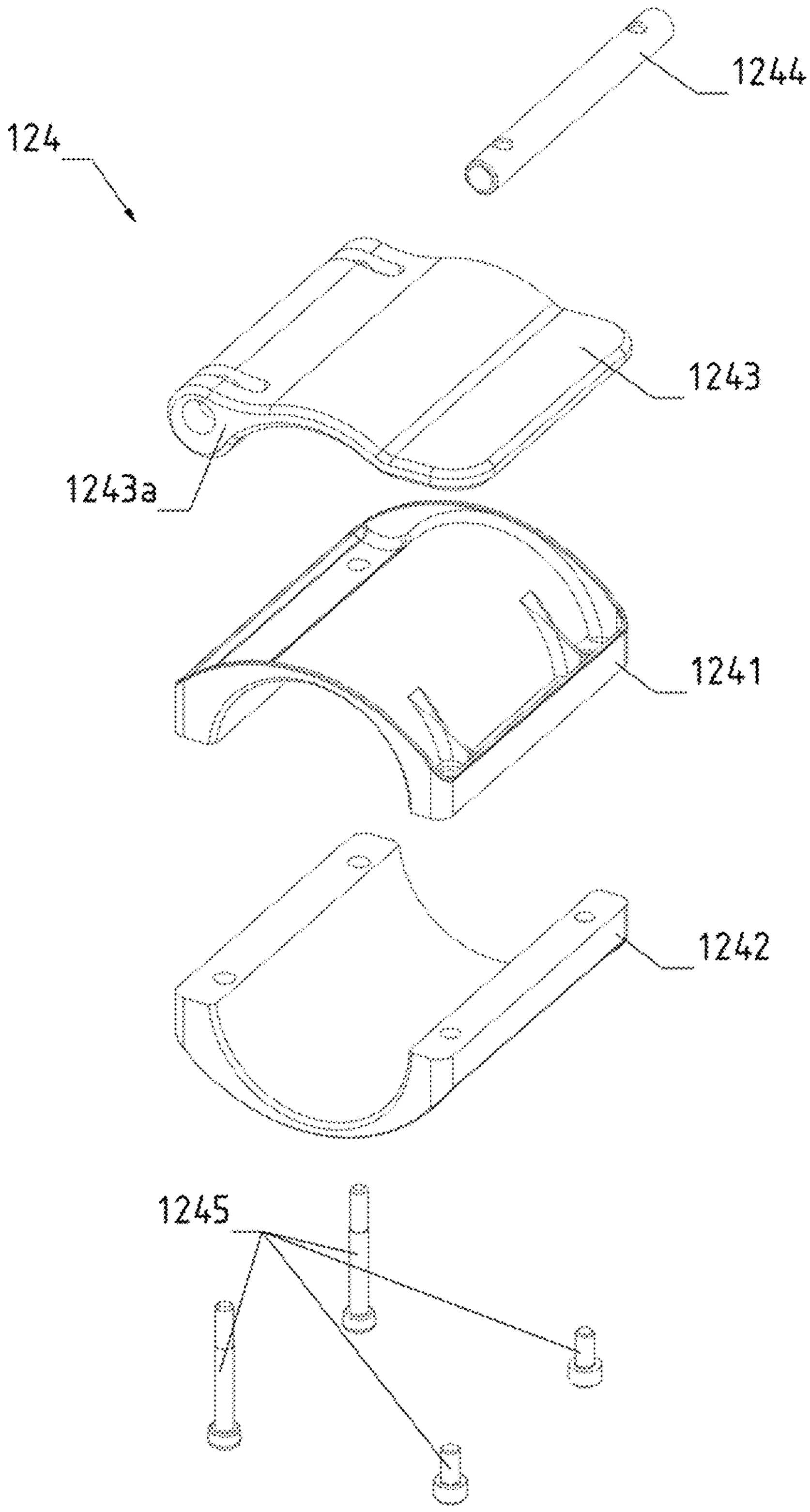
FIG. 5 shows an exploded view of an arm joint clamp.
Figure 6:
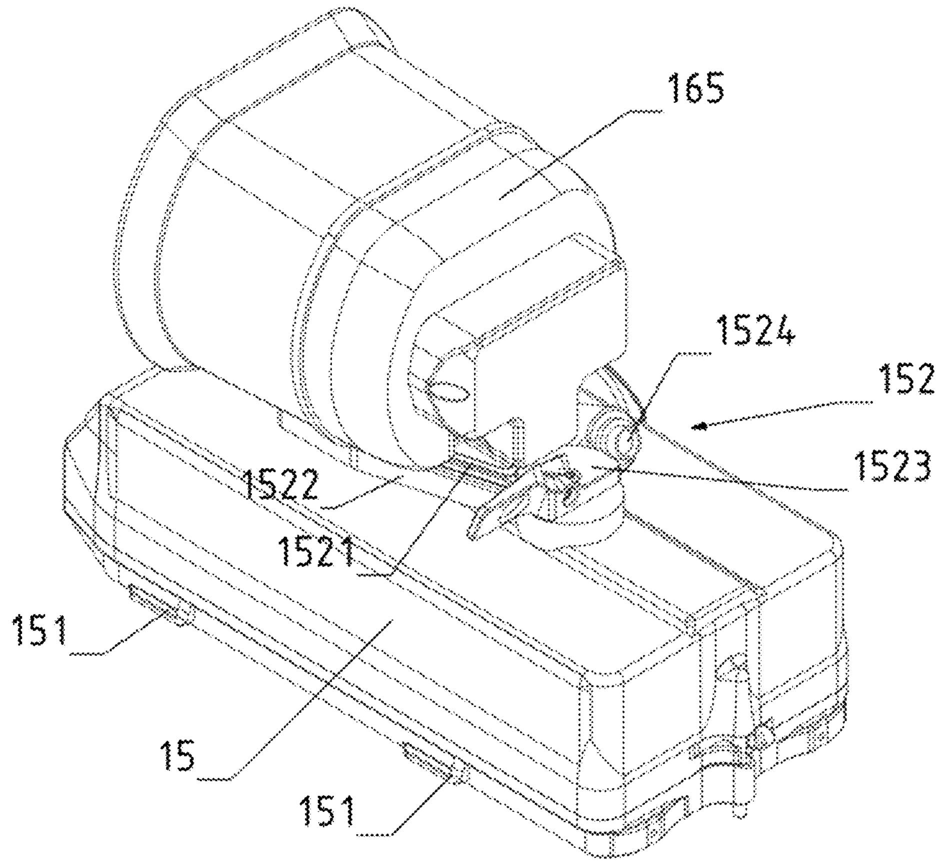
FIG. 6 shows a perspective view of a payload connected to a battery.

As shown in FIG. 5 the clamp 124 may comprise a lower plate 1242, an upper plate 1241, a top plate 1243, a supporting rod 1244, and connecting screws/bolts 1245. The lower plate 1242 and the upper plate 1241 may each be broadly characterised as half cylinders that are affixed to each other by screw or bolts 1245 about the flight spar. Each plate comprises a concave and convex surface that form about the flight spar. The top plate 1243 moulds about the top convex surface of the upper plate 1241. The left portion of the top plate 1243 comprises a side cylinder, with an internal cylindrical cavity that lines up with corresponding holes in the plate 1243. The supporting rod 1244 is locates in the internal cylindrical cavity of the top internal cylindrical cavity and the corresponding holes of upper plate 1241, thereby connecting the top plate 1243 to the upper plate 1241 to support rotational movement of the top plate 1243 about the axis of the supporting rod 1244. The side cylinder of the top plate 1243 may include a cam formed by offsetting the centre of the internal cylindrical cavity, the cam facing downwards to the upper plate 1241 when the top plate 1243 is mounted on the upper plate 1241. This has the effect of pushing down on the upper plate 1241 which locks the clamp in position as the upper plate 1241 pushes down on the flight spar. Once the top plate 1243 is rotated upward about the supporting rod 1244 axis, the cam **1243*a* disengages from the upper plate 1241** which in turn disengages the clamp from the flight spar.

The clamp 124 may be assembled across a spar of a flight arm (cross arm 122 or main arm 121) at a connection location. While in the released configuration the clamp 124 is moved such that it at least overlaps the partial sleeve of the cross arm connector 126 or the main arm connector 123. Once the top plate 1243 is rotated to mount the upper plate 1241 this applies pressure on the partial sleeve which thereby clamps the spar of the relevant flight arm.

An advantage of the multicopter 10 as described is the efficient folding of the multicopter 10. Also, the folding of the multicopter 10 is such that the flight arms protect the payload, the battery and/or the communication devices.

With reference to FIGS. 1 to 3, the embodiment depicted has a hub 11 and battery 15 with its main (i.e. longest) axis in the horizontal plane. As shown in FIG. 1 the main flight arm 121 extends out radially from the hub 11 in the horizontal plane and connects to two cross arms 122 that form "T" shape flight arms. The main arms 121 are connected to the hub 11 at the main arm connector 123. The main arm 121 and the cross arms 122 connect at the cross arm connecter 126. At each of these connection points there is located a clamp 124 that retains the flight arms in their deployed state. The multicopter 10 includes a payload 30 in the form of a camera attached to a mount located on the side surface of the hub 11. Also included are GPS antenna 161 at the cross arm connecter 126. Landing gear 14 may extend from the hub 11. Motors 18 are located at the distal end of each of the cross arms 122. Flight antenna are also located at the cross arm connecter 126.

Upon folding the clams are disengaged and the main arm 121 is folded up towards the hub 11. The hinging of the main arm connector 123 provides for rotation in two degrees of freedom (i.e. Two Cartesian axis) such that the main arm rotates 90□ on its longitudinal axis. The cross arms 122 are folded 90□ towards the main arm such that the cross arms 122 and the main arm 121 form a stacked arrangement (i.e. effectively an "M"-arrangement). That is, the main arm 121 is sandwiched by the cross arms 122. The cross arms 122 may begin their folding as the main arm 121 begins to fold. The cross arms 122 rotate about an axis with one degree of freedom.

The cross arms 122 may be longer than the main arms 121 since this provides space for the motors 15 to locate close to, or adjacent the main art connector 123. In some embodiments the cross arms 122 may be longer than the main arm 121 to create a space or cavity between the main arm connector 123 and the motors 15. In this space may be locate component such as a payload, antenna and/or GPE, which would effectively be protected by the flight arms when in the folded state. As shown in FIG. 3, if the cross arms 122 are sufficient long, then they create a protected space at the end of the hub 11. This space can be used to locate components such as a payload 30 in the form of a camera 163 as shown.

Figure 7:
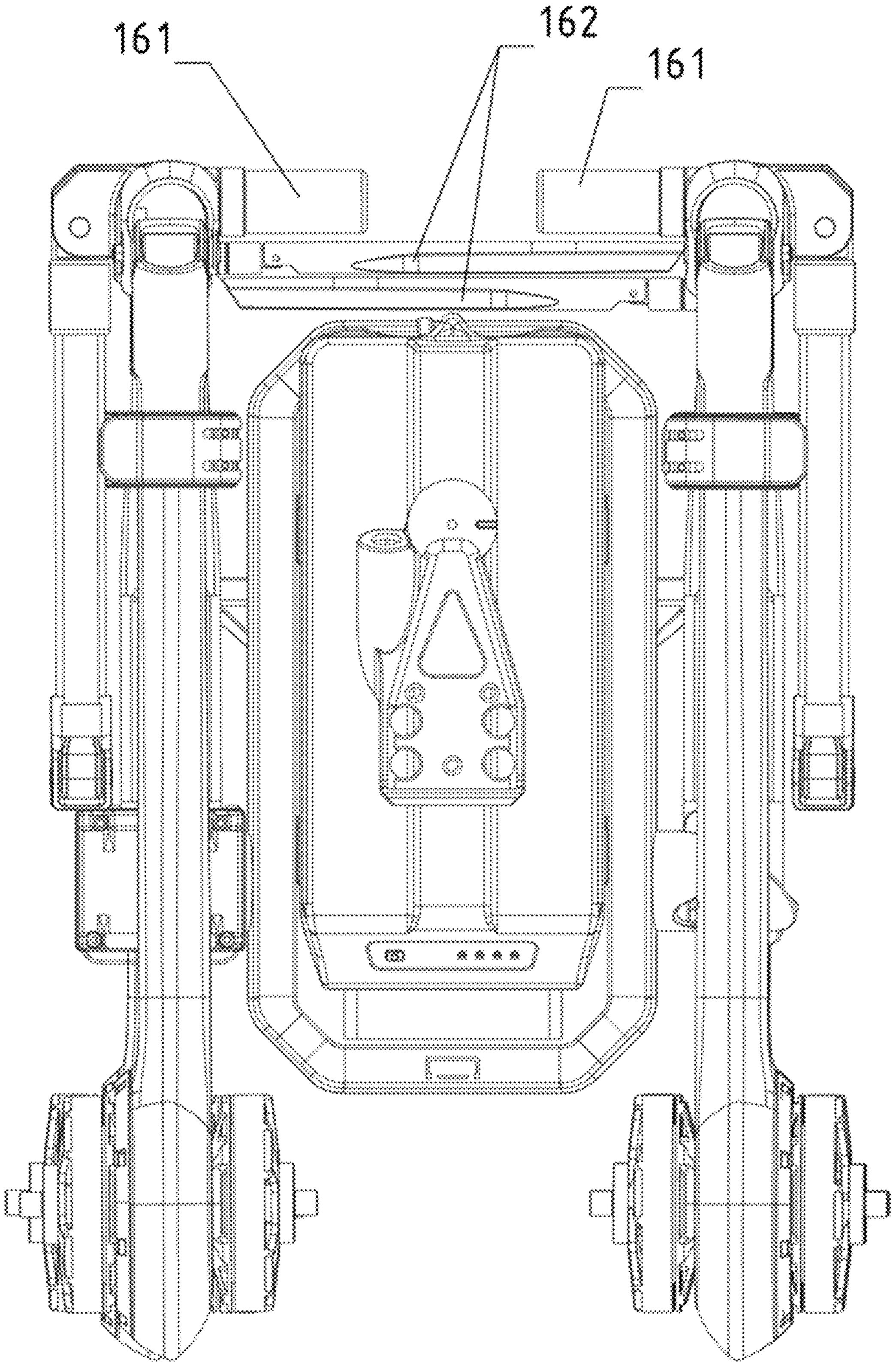
FIG. 7 shows a top view of a multicopter in a stowed state.

As shown in FIG. 7 the cross arms may be of a length that they extend past the hub 11 at the non-motor end of the cross arms. This creates a protected space at the end of the hub 11 which as shown may comprise components such as antenna 162 or the GPS 161.

Figure 8:
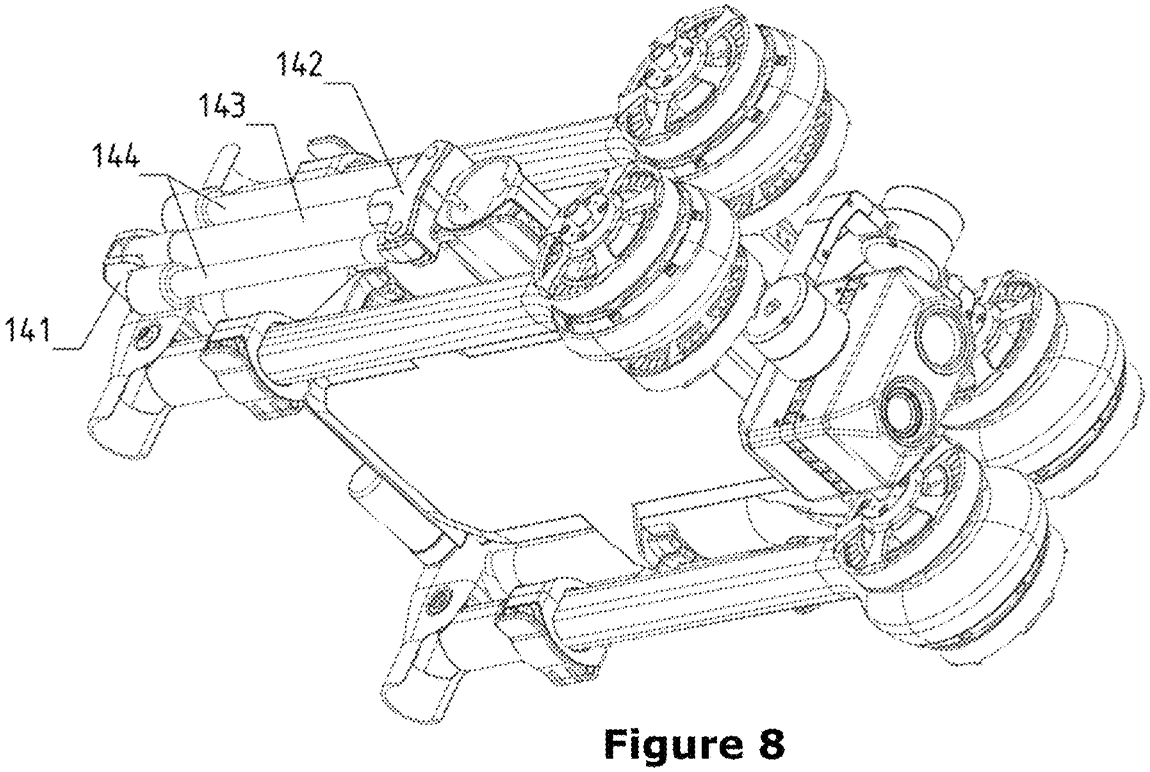
FIG. 8 shows a perspective view of a multicopter in a stowed state.

As shown in FIG. 8 the landing gear 14 can be stowed against the hub 11. For example, the landing gear 14 is removable from the hub 11 or flight arms when in the deployed state and can clipped or be held against the hub 11 when in the stowed state. As mentioned previously, the landing gear 14 may be connected to a flight arm 12 as shown in FIG. 1 and FIG. 2A.

Figure 9:
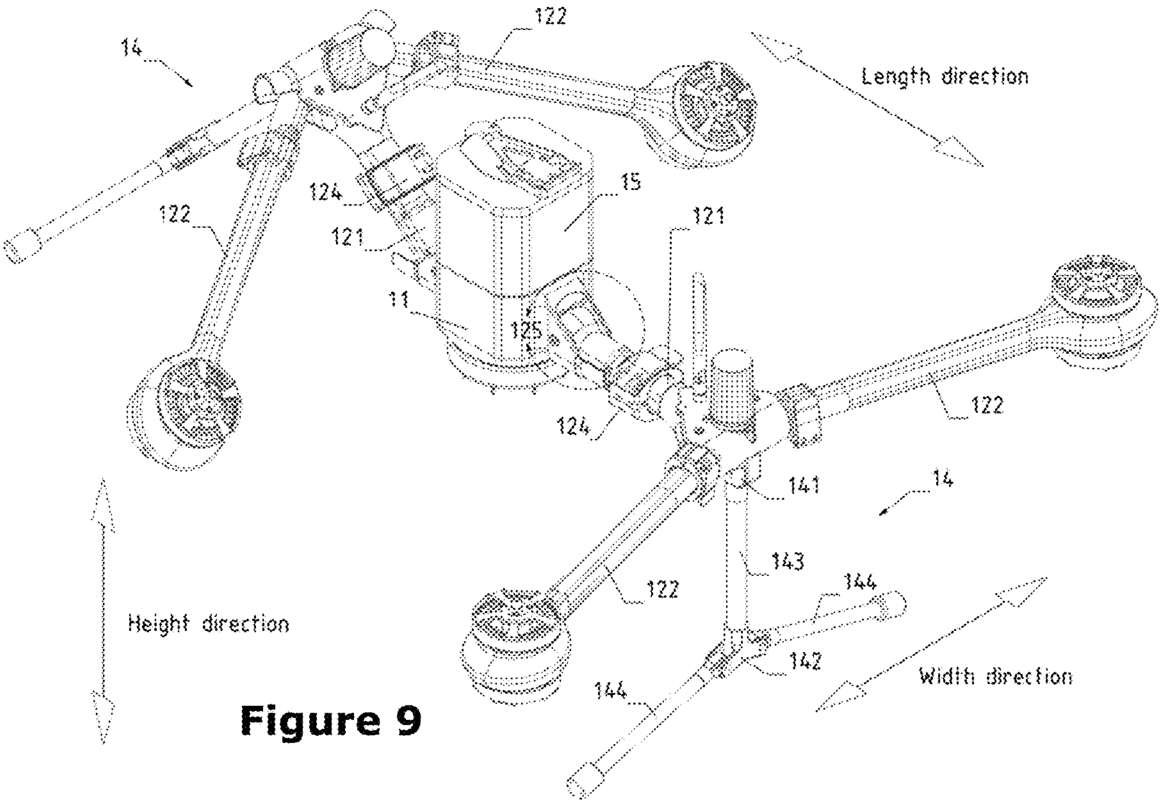
FIG. 9 shows a perspective view of a multicopter as described.
Figure 10:
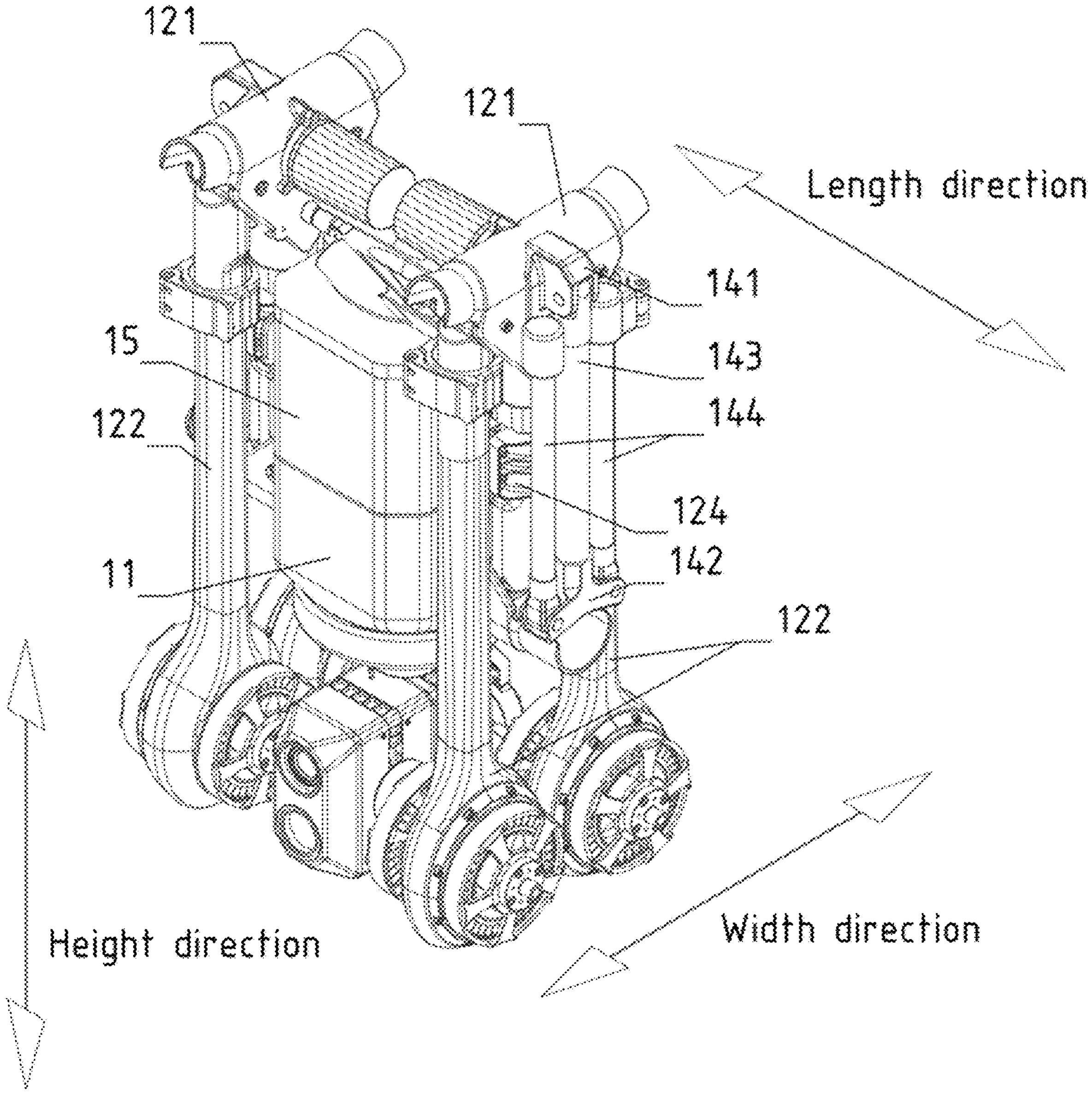
FIG. 10 shows a multicopter of FIG. 9 in a stowed state.

With reference to FIGS. 9 to 11, the embodiment depicted has a hub 11 and battery 15 with its main (i.e. longest) axis in the vertical plane. As shown in FIG. 9 the main flight arm 121 extends out radially from the hub 11 in the horizontal plane and connects to two cross arms 122 that form "T" shape flight arms. The main arms 121 are connected to the hub 11 at the main arm connector 123. The main arm 121 and the cross arms 122 connect at the cross arm connecter 126. At each of these connection points there is located a clamp 124 that retains the flight arms in their deployed state. The multicopter 10 may include a payload 30 in the form of a camera attached to a mount located on the side surface of the hub 11. Also included are GPS antenna 161 at the cross arm connecter 126. Landing gear 14 may extend from the hub 11. As mentioned previously, the landing gear 14 may be connected to the flight arm 12 as shown in FIG. 1 and FIG. 2A. Motors 18 are located at the distal end of each of the cross arms 122. Flight antenna are also located at the cross arm connecter 126.

Upon folding the clams are disengaged and the main arm 121 is folded up towards the hub 11. The hinging of the main arm connector 123 provides for rotation in one degree of freedom (i.e. one Cartesian axis) such that the main arm rotates 90□ towards the hub 11. The cross arms 122 are folded 90□ towards the main arm such that the cross arms 122 and the main arm 121 form a stacked arrangement (i.e. effectively an "M"-arrangement). That is, the main arm 121 is sandwiched by the cross arms 122. The cross arms 122 may begin their folding after the main arms 121 are folded. The cross arms 122 rotate about an axis with one degree of freedom.

The cross arms 122 may be longer than the main arms 121 since this provides space for the motors 15 to locate close to, or adjacent the main art connector 123. In some embodiments the cross arms 122 may be longer than the main arm 121 to create a space or cavity between the main arm connector 123 and the motors 15. In this space may be locate component such as a payload, antenna and/or GPE, which would effectively be protected by the flight arms when in the folded state. As shown in FIG. 3, if the cross arms 122 are sufficient long, then they create a protected space at the end of the hub 11. This space can be used to locate components such as a payload 30 in the form of a camera 163 as shown.

When converting the multicopter 10 from a stowed configuration (i.e. the folded configuration) to an unstowed configuration (i.e. a ready-to-fly unfolded configuration) the cross arms 122 are rotated to an unstowed configuration before the main arm 121 is rotated to an unstowed configuration. This is to ensure that the cross arms 122 do not contact another component of the multicopter 10, such as a payload. In some embodiments, the multicopter 10 comprises a locking member 131 for the main arm 121 and cross arms 122 that may be configured to restrict the order of movement of the flight arms 12 between a stowed and unstowed configuration. That is, the locking member 13 may be configured when stowing the multicopter 10 to only allow movement of a cross arm 122 if the associated main arm 122 is already in the stowed position. Likewise, the locking member 13 may be configured when unstowing the multicopter 10 such that the main arm 121 can only be unstowed if the associated cross arm(s) 122 is already in the unstowed position. Hence when stowing the multicopter 10 the order of folding of the flight arms 12 is (1) main arm(s) 121 and then (2) cross arms 122. When unstowing the multicopter 10 the order of unfolding of the arms is (1) cross arms 122 and then (2) main arm(s) 121.

Figure 21:
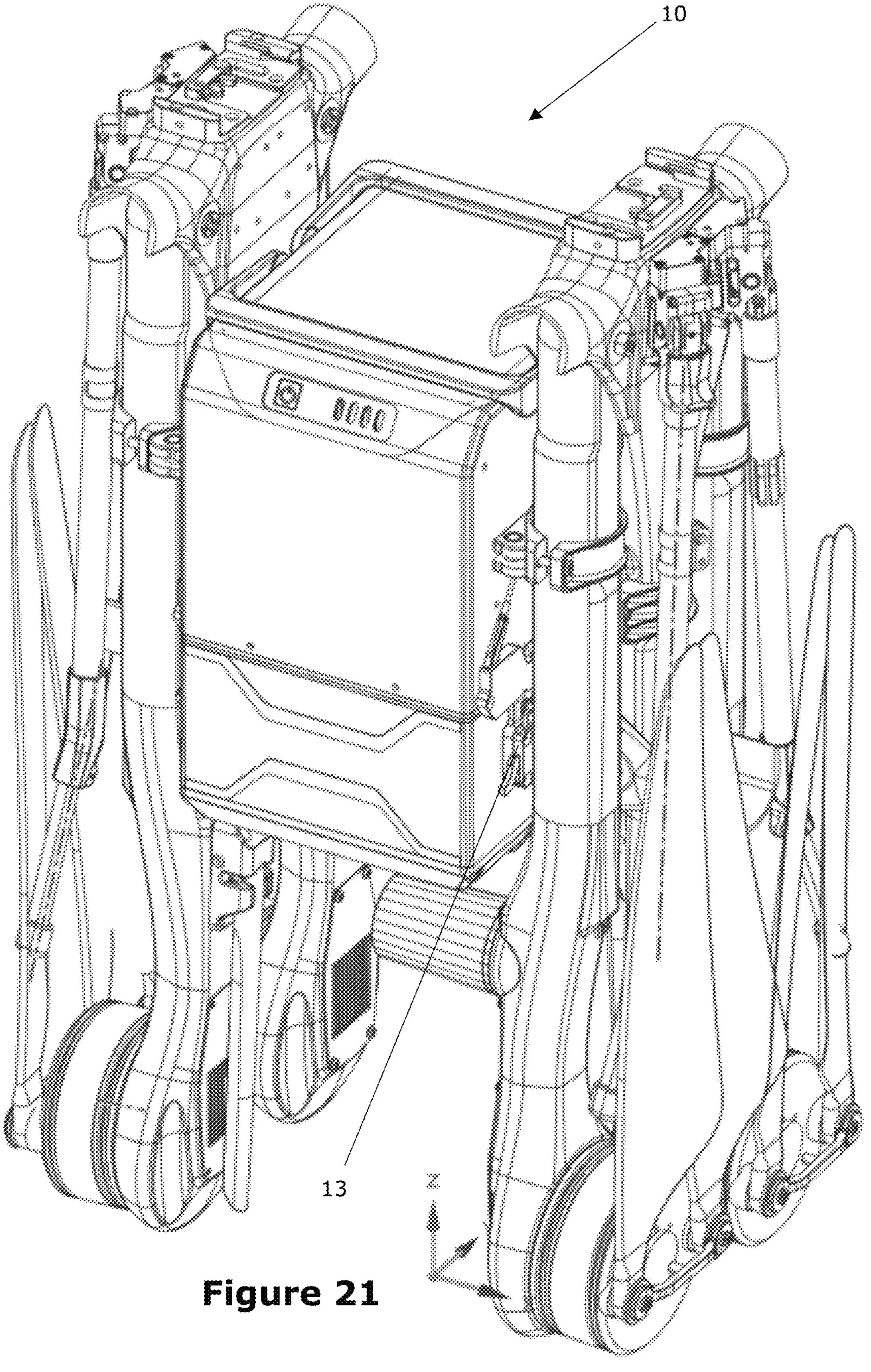
FIG. 21 shows a multicopter in the fully stowed configuration, the multicopter including a locking member for the flight arms.
Figure 22:
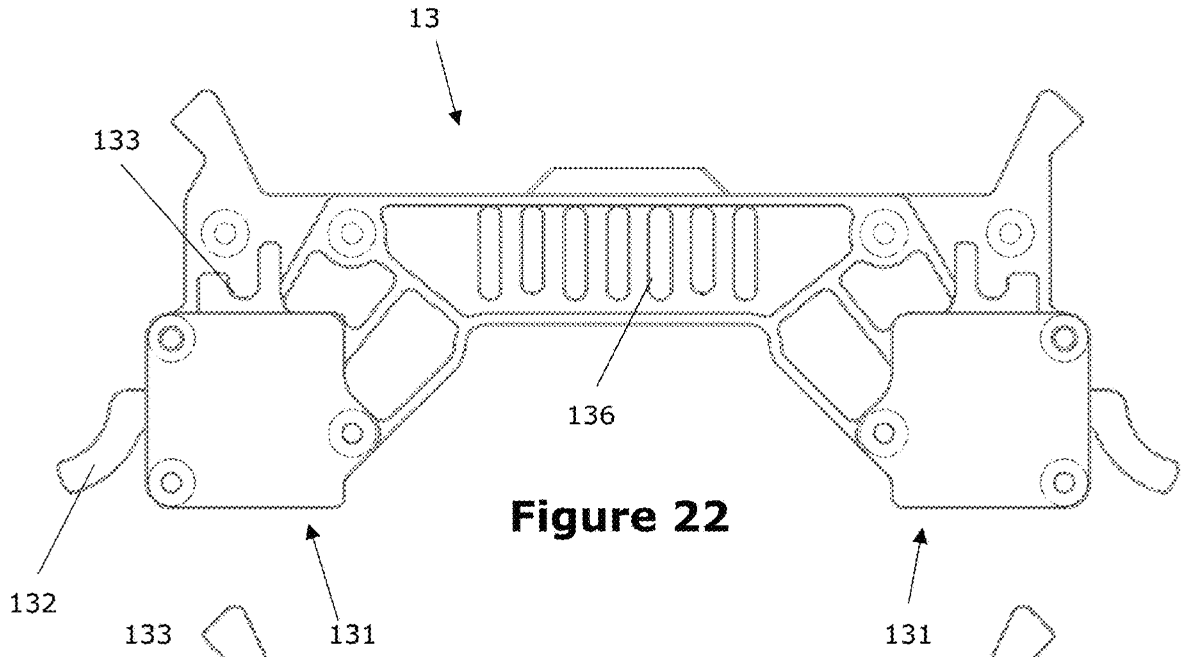
FIG. 22 shows a front view of a locking member, the locking member being in the flight arm locked configuration.
Figure 23:
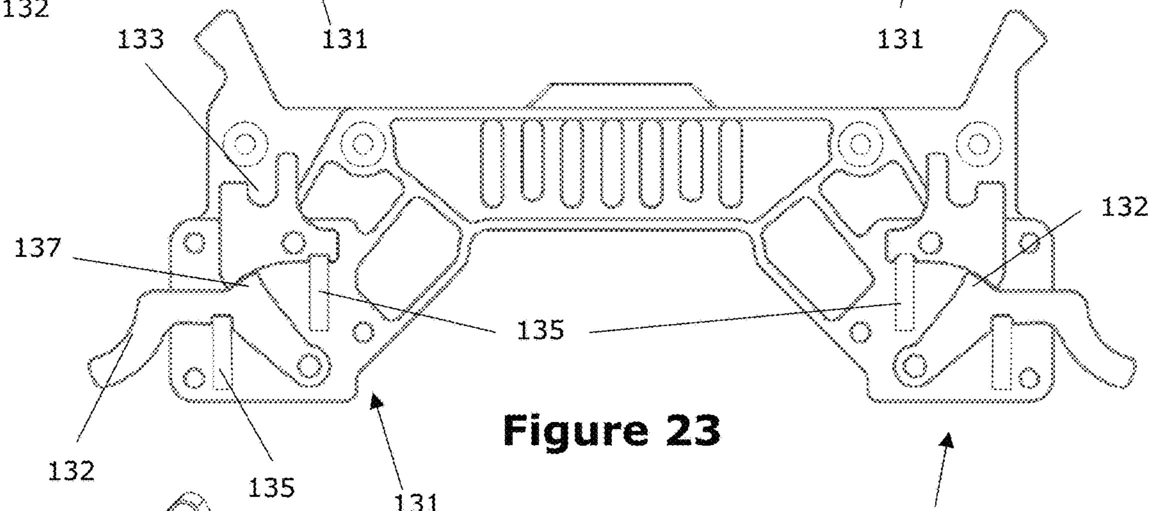
FIG. 23 shows a rear view of a locking member, the locking member being in the flight arm locked configuration
Figure 24:
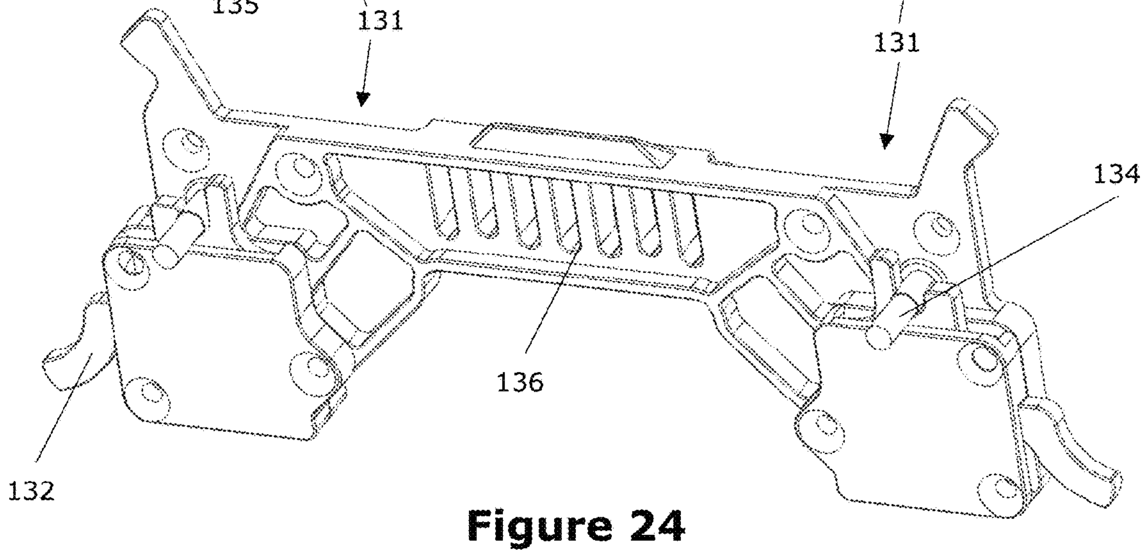
FIG. 24 shows a front perspective view of the locking member, the locking member engaged with the flight arm pin.
Figure 25:
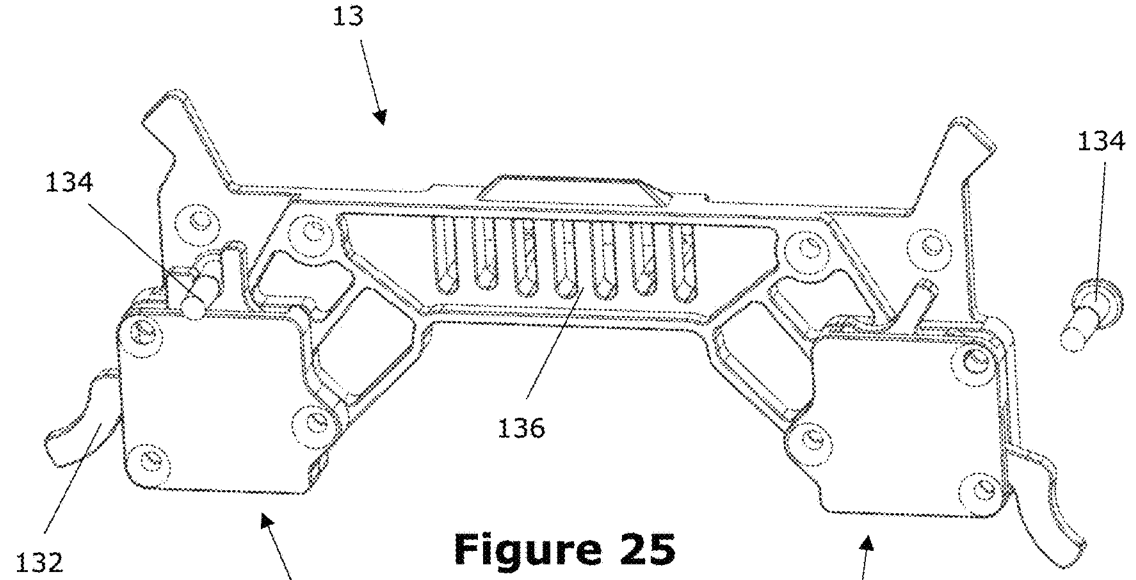
FIG. 25 shows a front view of a locking member, with the left hand locking mechanism of the locking member in a locked configuration with the flight arm pin, and the right hand locking mechanism of the locking member in an unlocked configuration.
Figure 26:
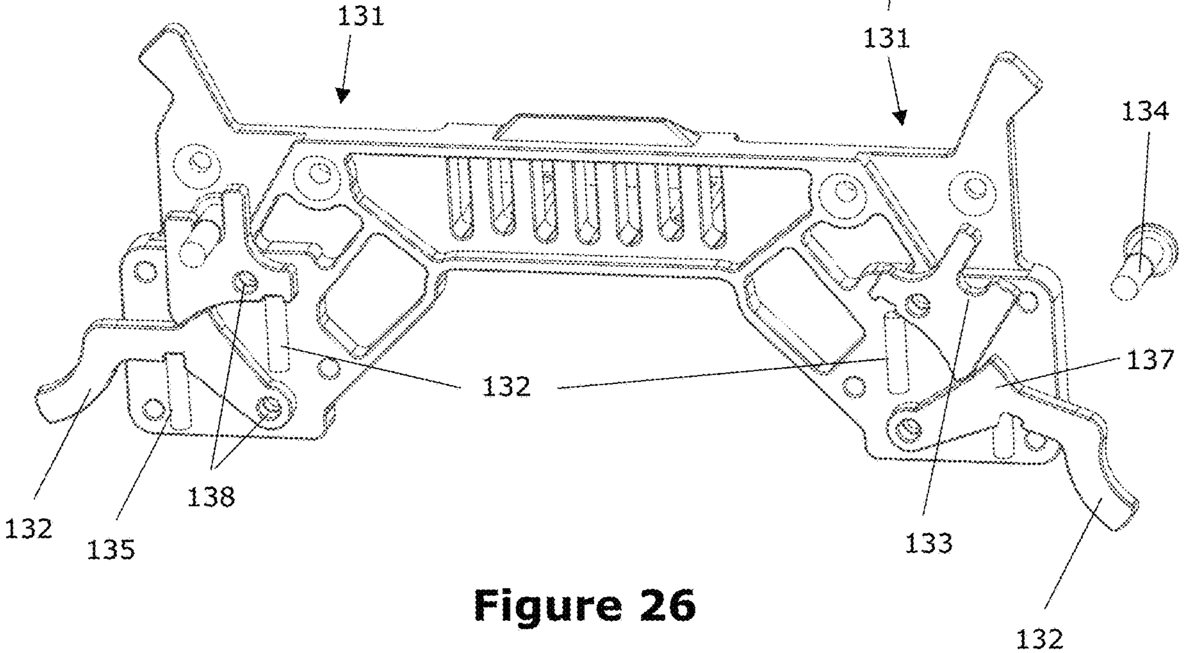
FIG. 26 shows a rear view of a locking member, with the left hand (viewed from the rear) locking mechanism of the locking member in a locked configuration with the flight arm pin, and the right hand (viewed from the rear) locking mechanism of the locking member in an unlocked configuration

A locking member 13 is shown in FIGS. 21 to 26. FIG. 21 shows a stowed multicopter 10 with the flight arms 12 locked in place by the locking member 13. The locking member 13 may comprise two locking mechanisms 131: being a left and a right mechanism to lock the two cross arms 122. Each locking mechanism may comprise a first portion 1311 and a second portion 1312. The central portion 136 of the locking member 13 may be attached to the hub 11 or the battery 15. Each locking mechanism 131 may comprise a release lever 132 as the second portion 1312 that can be actuated by the user to release the lock on the first portion 1311 of the locking mechanism 131. The lock of the locking mechanism 131 may comprise a locking slot 133 on the first portion 1311 that can be rotated about a rotational axis 138 by movement of the release lever 132 also about a rotational axis 138. The cross arm 122 of the flight arm may comprise a locking pin 134 that corresponds to the locking slot 133. That is, the locking pin 134 is captured by the locking slot 133 to lock the cross arm 122 in place. Movement of the locking lever 132 about the rotational point 138 rotates the locking slot 133 about its rotational point 138 thereby releasing the locking pin 134 allowing the cross arm 121 to be moved from the stowed to the unstowed configuration. The second portion 1312 may comprise a cam 137 that operates against the first portion 1311 to cause rotational movement of the first portion 1311 about its rotational point 138. The first portion 1311 and second portion may include a biasing means 135 that biases the release lever 132 and the locking slot 133 into the locking configuration. The biasing means 135 may be a spring. The biasing means for the second portion 1312 may be a compression spring. Thus when the user moves the release lever 132 it moves against the force of the biasing means and thus when released the release lever 132 moves back into a locking configuration. Likewise the biasing means against the first portion 1311 moves the first portion 1311 back into the locking position. The locking pin 134 may include an enlarged end that prevents the locking pin 134 being pulled out of the locking slot 133. The enlarged end may be a head such as a head on a nail. This head prevents the main arm 121 from being moved from a stowed to an unstowed configuration. Thus the locking pin 134 is locked on the cross arm 122 at a position to mate with the locking slot 133 of the locking mechanism 131. That is, the locking pin 134 prevents movement of the locking pin in the x-axis relative to the locking member 13.

As shown in FIGS. 10 and 11 the cross arms may be of a length that they extend past the hub 11 at the non-motor end of the cross arms. This creates a protected space at the end of the hub 11 which as shown may comprise components such as antenna 162 or the GPS 161.

The landing gear 14 may be stowed against the hub 11. For example, the landing gear 14 may be removable from the hub 11 or flight arms when in the deployed state and can clipped or be held against the hub 11 when in the stowed state. As mentioned previously, the landing gear 14 may be connected to the flight arm 12 as shown in FIG. 1 and FIG. 2A. The landing gear 14 may then fold up against the flight arms 12 to be located substantially parallel to the flight arms 12.

As shown in FIG. 13, the multicopter 10 may support a plurality of payloads 30 from one or more of the flight arms 12 and the hub 11.

The multicopter 10 may simultaneously mount both a bottom mounted gimballed camera and one or more front mounted cameras on the flight arms. This mounting may achieve a field of view completely free of rotor and landing gear 14 interference.

The multicopter 10 as described may provide for a shrinking ratio between the deployed and stowed state of at least 1:6, 1:7, 1:8, 1:9, 1:10, 1:11, 1:12, 1:13, 1:14, 1:15 or 1:16, and useful ranges may be selected between any of these values. When comparing the shrinking value this includes the presence of a battery 15 and payload 30 on the multicopter 10 as described. That is, the shrinking value as defined for a multicopter 10 including a battery 15 and payload 30 30.

Put another way, the multicopter 10 comprising a battery 15 and payload 30 has a stowed volume that is about 15, 14, 13, 12, 11, 10, 9, 8, 7 or 6% of the deployed volume, and useful ranges may be selected between any of these values.

In practice, a stowed state with a battery 15 and a payload 30 included is desirable since this minimises deployment time. That is, as soon as the airframe is mechanically unfolded, the multicopter 10 is ready to fly. The user does not have to spend time plugging in a battery 15 and attaching a camera.

In one example of the multicopter 10 as described the product may have the following technical specifications:

Rotor size: 28"×8.

Battery: 44.4V, 35000 mAh

Maximum Take-off Weight: 25 kgs

Maximum flight time without payload: 70 minutes

Maximum payload 30 (excluding battery): 10 kgs

The multicopter 10 as described may have a default heading and flying direction parallel to the longitudinal axis of the main arms (i.e. perpendicular to the cross arms), thus positioning one of the front mounted cameras facing forward (see FIG. 4). This provides an advantage over present devices that have default heading and flying direction parallel to the cross arms. A disadvantage of such as design as provided in the present devices is that the flying heading does not allow the camera front mounted on the arm to view the space the drone is flying into.

Figure 27:
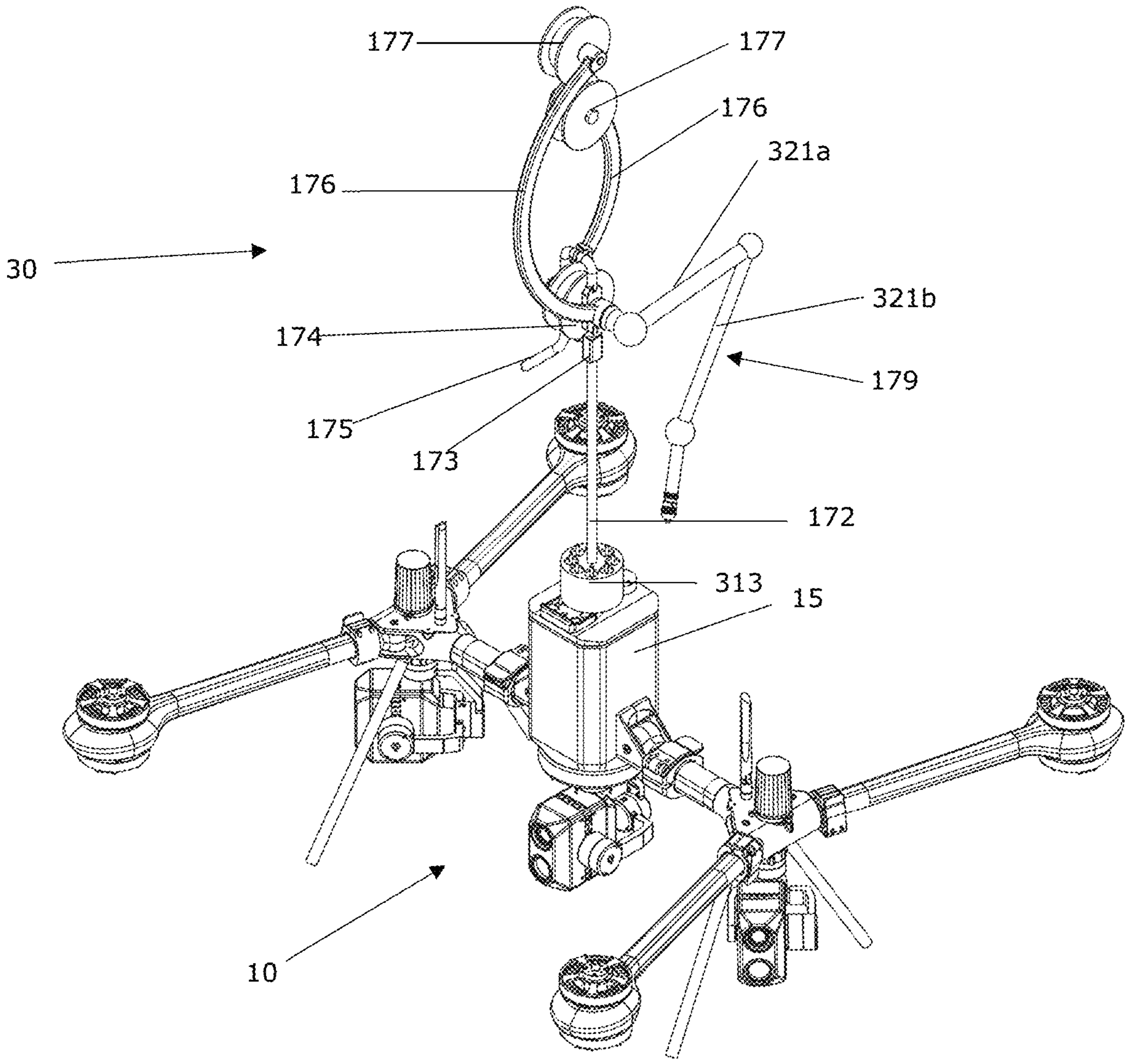
FIG. 27 shows a multicopter with a transmission line maintenance attachment.

In one embodiment as shown in FIG. 27, the multicopter 10 may include as an attachment to the battery 15 a transmission line maintenance attachment 30 as described in our Australian provisional patent application 2022902146 incorporated by reference. The transmission line maintenance attachment 17 may extend from an attachment mechanism 171 attached to the battery 15. Extending from the attachment may be a shaft 172 extending vertically to define a distal shaft end 173 having a main wheel 174 rotatable about a substantially horizontal axis, connected to the distal shaft end 173. An inspection device 175 may extend from the transmission line maintenance attachment 30. Two or more rotatable arms 176 extend, directly or indirectly, from the main wheel 174, the two or more rotatable arms 176 rotatable about a substantial horizontal axis. Each rotatable arm 176 has an accessory wheel 177 located at the distal end of the respective rotatable arm 176 that is engageable with a power transmission line.

The rotatable arms 176 of the transmission line maintenance attachment 30 may be connected to and extend from the main wheel 174 at an angle. In one implementation when the main wheel 174 is in contact with a transmission line 22, the accessory wheels 177 of the rotatable arms 176 are held above the main wheel 174 or in a substantially perpendicular orientation with respect to the main wheel 174. In this implementation, the rotatable arms 176 are substantially vertical in relation their orientation with the main wheel 174. In this position, the accessory wheels 177 remain unengaged with the transmission line 178.

When the rotatable arms 176 are substantially vertical the main wheel 174 contacts the transmission line 178 and configured to transport the transmission line maintenance attachment 30 along a path of the transmission line 178 of the aerial power transmission line system, and each of the accessory wheels 177 are suspended above the main wheel 174. That is, the rotatable arms 176 adopt a disengagement condition with respect to the transmission line 178.

When the transmission line maintenance attachment 17 travels along the transmission line 178 it may encounter a hazard, object or obstruction. In order to traverse the hazard, object or obstruction (if required) the rotatable arms 176 can move downwards to a substantially horizontal position. That is, the rotatable arms 176 adopt an engagement condition with respect to the transmission line. Once the accessory wheels 177 contact with the transmission line 178 the rotatable arms 176 can continue to rotate thereby lifting the transmission line maintenance attachment 30 such that the main wheel 174 is suspended above the transmission line. This configuration allows the transmission line maintenance attachment 17 to move along the path of the transmission line of the aerial power transmission line system. The accessory wheels 177 once in an engagement condition are spaced from the vertical plane of the main wheel 174.

When the main wheel encounters an obstruction that it cannot pass, such as a line spreader, the rotatable arms 176 rotate downwards to the transmission line such that the leading accessory wheel 177 comes into contact with the transmission line in front of (i.e. relative to the direction of movement of the transmission line maintenance attachment 30) the obstruction. The trailing accessory wheel 177 remains behind the obstruction. The transmission line maintenance attachment 17 then moves forward such that the main wheel 174 passes above the obstruction. At this point the main wheel 174 can be lowered to the transmission line in front of the obstruction as the rotatable arms 176 rotate upwards to adopt a disengagement condition with respect to the transmission line. In this manner, the transmission line maintenance attachment 17 can pass by the hazard, object or obstruction. As used herein, the terms "leading" or "trailing" are used relative to the movement direction of the transmission line maintenance attachment 30. "Leading" means the portion of the transmission line maintenance attachment 17 forwardmost in terms of the direction of movement, whereas "trailing" means the portion of the transmission line maintenance attachment 17 rearmost in terms of the direction of movement of the transmission line maintenance attachment 30. Given the transmission line maintenance attachment 17 can move forwards or backwards relative to movement along a transmission line 22, the definition of which is "leading" and "trailing" can swap depending on the direction of movement of the transmission line maintenance attachment 30.

The transmission line maintenance attachment 17 may comprise an inspection device 175. The inspection device 175 may comprise a plurality of sensors including a first-person view camera (FPV), infrared camera radar, multi-spectral camera, hyperspectral camera, night vision camera, depth sensing camera, a lidar mounted on the surface of the housing, a video capture camera, a micROM camera and an ultraviolet camera. The inspection device 175 is configured to inspect at least the transmission line of the aerial power transmission line system. Other examples of sensors includes in the inspection device may be laser rangefinders, and laser scanners.

The inspection device 175 may further comprise an object detection module configured to detect an object along the path of the transmission line. Typically, the object along the path of the transmission line may be other power lines running parallel to or across the path of the current transmission line, or vegetation or man-made structures getting in the path of the virtual flight tunnel. The object detection module may comprise one or more sensors including but not limited to visual cameras, thermal cameras and corona cameras.

The transmission line maintenance attachment 17 may comprise a robotic arm 179 configured to perform intervening operations such as regular maintenance and other contact or non-contact based operations and interventions.

The contact-based inspection and intervention by the robotic arm 179 may comprises identification and elimination of foreign objects accidentally attached to the aerial power transmission line system. The non-contact based inspection by the robotic arm 179 comprises tracking a target on the transmission line and capturing imagery and lidar data.

The transmission line maintenance attachment 17 may comprise an engagement module (not shown) comprising a breaking module configured to regeneratively and/or mechanically brake and alter momentum of the transmission line maintenance attachment 17.

The engagement module may comprise a locking module (also not shown) configured to lock any one of the main wheel 174 or each of the accessory wheels 177 such that the position of the transmission line maintenance attachment 17 is fixed at a desired location on the path of the transmission line. Once locked on the desired location, the transmission line maintenance attachment 17 may commence regular maintenance, intervention, or inspection operations.

Although embodiments have been described with reference to a number of illustrative embodiments thereof, it will be understood by those skilled in the art that various changes in form and details may be made therein without departing from the spirit and scope of the invention as defined by the appended claims. Many modifications will be apparent to those skilled in the art without departing from the scope of the present invention as herein described with reference to the accompanying drawings.

We claim:

1. A multicopter foldable between a first, folded stowed state and a second, expanded operational state, the multicopter comprising:

a hub configured to receive one or more payloads and a battery, two or more flight arms that extend substantially horizontally when in the operational state, each flight arm of the two or more flight arms comprising: (i) a main arm, each main arm extending from the hub at a main arm pivoting connection, and (ii) two cross arms extending from the main arm at a cross arm pivoting connection, the main arm pivoting connection allowing each of the main arms to pivot towards the other main arm to a stowed state wherein each of the main arms are substantially parallel to the other main arm(s) in a vertical axis, the cross arm pivoting connection adapted to allow each of the cross arms to rotate towards the main arm to a stowed state wherein each of the cross arms are substantially parallel to the other cross arms, wherein the multicopter comprises landing gear that is substantially parallel to the flight arm when in a stowed state and an operational stowed state and either i) extends from an intersection region between the main arm and cross arms of the two or more flight arms via a hingeable connection; or ii) extends pivotably from the hub, wherein the landing gear is adapted to fold against the main arm, such that the landing gear is substantially parallel to the flight arm when in a stowed state and an operational stowed state, and wherein the multicopter further comprises a notional polyhedron defined by the flight arms when in the stowed state, the notional polyhedron defines a volume to contain, when present, the one or more payloads and a fuselage, wherein each flight arm of the two or more flight arms and the landing gear is positioned parallel to an elongate axis of the hub in the first, folded stowed state, and wherein, in the first, folded stowed state, elongate axes of the main arms, the cross arms, and the landing gear are adjacently aligned and substantially parallel to each other and to an elongate axis of the hub.

2. The multicopter of claim 1, wherein a stowed volume of the multicopter is less than 10% of the volume of the multicopter when in the operational state.

3. The multicopter of claim 1 comprising two or more payloads, each payload of the two or more payloads extending from i) the battery, ii) the hub, or iii) the cross arms in a region of the cross arm connection to the main arm, iv) main arm, or v) a combination of any two or more of (i) to (iv).

4. The multicopter of claim 1 wherein the payload is selected from any one or more of a camera, a sensor or a communication device.

5. The multicopter of claim 1 comprising two or more payloads, wherein at least two of the payloads are located on a different flight arm.

6. The multicopter of claim 1 wherein the hub has an elongate axis in a same horizontal plane as the flight arms when the multicopter is in the operational state, or orthogonal to the horizontal plane of the flight arms when the multicopter is the operational state.

7. The multicopter of claim 1 wherein the hub comprises i) a battery, ii) a payload, or iii) a battery and a payload.

8. The multicopter of claim 1 wherein the hub comprises side walls along a main elongate axis of the hub, and end walls.

9. The multicopter of claim 1 wherein at least one payload 30 connector is located on i) an end wall, ii) both end walls, iii) one or more side walls, or iv) a combination of any two or more of (i) to (iii).

10. The multicopter of claim 1 wherein at least one main arm pivoting connection attaches to, or extends from, at least one side wall and/or one end wall of the hub.

11. The multicopter of claim 1 wherein the main arm pivoting connection attaches to, or extends from, opposing side walls of the hub.

12. The multicopter of claim 1 wherein the main arm pivoting connection is formed integrally with the hub.

13. The multicopter of claim 1 wherein the main arm pivoting connection is adapted to provide for a hingeable connection that provides 90° rotation of the main arm in each of two Cartesian axis.

14. The multicopter of claim 1 wherein a length of the main arm intersects the two cross arms.

15. The multicopter of claim 1 wherein each cross arm of the two or more flight arms connects to the main arm with a hingeable connection to allow rotation of the cross arm in one Cartesian axis of up to 150°.

16. The multicopter of claim 14 wherein a communication device is located at or on the intersection between the cross arm and the main arm.

17. The multicopter of claim 1 comprising at least one clamp adjacent a pivoting point, such that the clamp secures the arms in a deployed state.

18. The multicopter of claim 1 wherein the volume of the multicopter when in the stowed state is less than 5, 6, 7, 8, 9, 10, 11, 12% of the volume of the multicopter when in the operational state.

19. The multicopter of claim 1 wherein landing gear extends from the flight arms.

20. The multicopter of claim 1 wherein the landing gear is adapted to fold against a main arm, such that the landing gear is substantially parallel to the main arm when in the stowed state.

21. The multicopter of claim 1 wherein the multicopter comprises a locking member which restricts order of movement of the flight arms between a stowed and an unstowed configuration, such that when stowing the multicopter the locking member permits movement of a cross arm when the associated main arm is already in the stowed position, and when unstowing the multicopter the locking member permits movement of the main arm when the associated cross arm(s) are in the unstowed configuration.

22. The multicopter of claim 21 wherein the locking member comprises a central portion for attachment to the hub or the battery; and wherein each locking member comprises a release lever as a second portion that is actuatable by a user to release a lock on a first portion of the locking member, the first portion comprising a locking slot that corresponds to a locking pin on a cross arm; and wherein movement of the release lever about a rotational point rotates the locking slot about a rotational point to release the locking pin permitting movement of the cross arm from the stowed to the unstowed configuration.

23. The multicopter of claim 22 wherein the first portion and second portion comprise biasing means that bias the release lever and the locking slot into a locking configuration.

24. The multicopter of claim 22 wherein the locking pin comprises an enlarged end that prevents removal of the locking pin out of the locking slot, and wherein the locking pin prevents movement of the locking pin in an x-axis relative to the locking member.

* * * * *